United States Patent
Stupachenko

(10) Patent No.: US 12,386,636 B1
(45) Date of Patent: *Aug. 12, 2025

(54) PORTABLE APPLICATION BASED VIRTUALIZATION

(71) Applicant: PARALLELS INTERNATIONAL GmbH, Schaffhaussen (CH)

(72) Inventor: Andrey Stupachenko, Moscow (RU)

(73) Assignee: Parallels International GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/411,618

(22) Filed: Jan. 12, 2024

Related U.S. Application Data

(63) Continuation of application No. 17/197,456, filed on Mar. 10, 2021, now Pat. No. 11,875,159.

(51) Int. Cl.
*G06F 9/44* (2018.01)
*G06F 9/445* (2018.01)
*G06F 9/455* (2018.01)

(52) U.S. Cl.
CPC ...... *G06F 9/44584* (2013.01); *G06F 9/45558* (2013.01); *G06F 2009/4557* (2013.01); *G06F 2009/45583* (2013.01)

(58) Field of Classification Search
CPC ............. G06F 9/44584; G06F 9/45558; G06F 2009/4557; G06F 2009/45583
See application file for complete search history.

(56) References Cited

U.S. PATENT DOCUMENTS

| | | | | |
|---|---|---|---|---|
| 8,091,084 | B1* | 1/2012 | Dobrovolskiy | G06F 9/45558 717/126 |
| 10,887,276 | B1* | 1/2021 | Parulkar | H04L 43/10 |
| 10,924,429 | B1* | 2/2021 | Gupta | H04L 47/788 |
| 11,765,244 | B1* | 9/2023 | Barclay | H04L 67/51 709/226 |
| 11,829,792 | B1* | 11/2023 | Chandrashekar | G06F 9/45558 |
| 11,875,159 | B1* | 1/2024 | Stupachenko | G06F 9/44584 |
| 11,886,932 | B1* | 1/2024 | Dasgupta | G06F 9/4881 |
| 12,056,515 | B1* | 8/2024 | Mills | G06F 21/53 |
| 12,056,516 | B2* | 8/2024 | Virtuoso | G06F 9/45558 |
| 2010/0268842 | A1* | 10/2010 | Kim | G06F 8/61 709/231 |
| 2020/0059420 | A1* | 2/2020 | Abraham | G06F 9/5072 |
| 2020/0401452 | A1* | 12/2020 | Piercey | G06F 9/5016 |
| 2021/0168027 | A1* | 6/2021 | Parulkar | G06F 9/4856 |
| 2021/0168092 | A1* | 6/2021 | Gupta | G06F 9/5072 |

(Continued)

*Primary Examiner* — Benjamin C Wu
(74) *Attorney, Agent, or Firm* — Rosenberg, Klein & Lee

(57) ABSTRACT

Virtualization exploits virtual rather than actual elements such as computer hardware platforms, storage devices, and computer network resources for example. However, prior art techniques have limitations including, for example, memory requirements and resource requirements which typically either limit their deployment to remote server based systems or limit the number of concurrent virtual machines a system can support. Embodiments of the invention address these limitations by supporting application virtualization on foreign operating systems with reduced resource usage by removing the requirement for virtualization of the entire foreign operating system. The inventive virtualization provides creation of an isolated memory space with isolated code execution using hardware assistance.

6 Claims, 8 Drawing Sheets

400B

(56) References Cited

U.S. PATENT DOCUMENTS

2022/0061059 A1* 2/2022 Dunsmore ............ H04L 9/0897
2023/0177192 A1* 6/2023 Magen .................... G06F 21/53
                                                                726/28

* cited by examiner

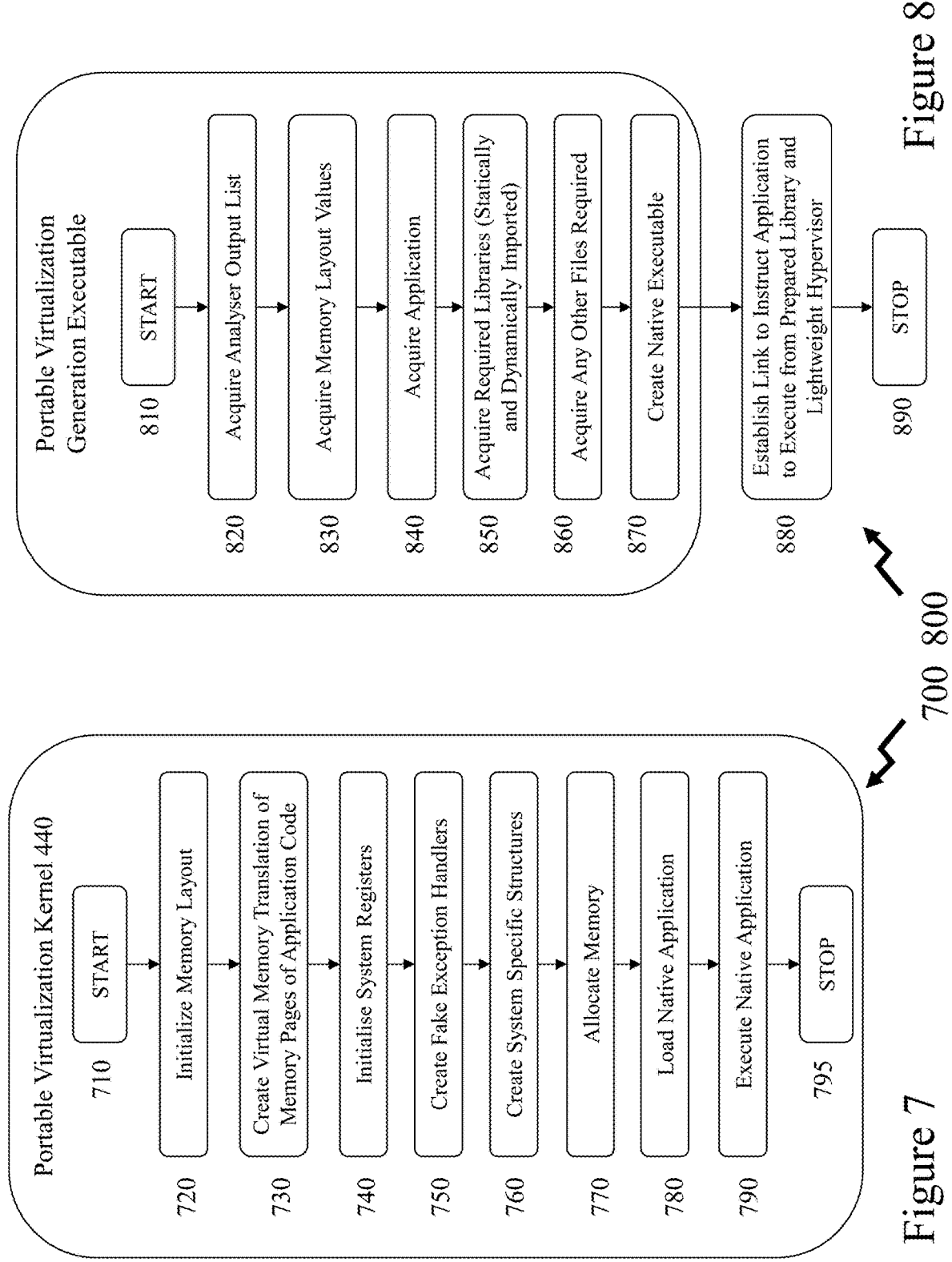

PORTABLE APPLICATION BASED VIRTUALIZATION

CROSS-REFERENCE TO RELATED APPLICATIONS

This claims the benefit of priority as a continuation of U.S. patent application Ser. No. 17/197,456 filed Mar. 10, 2021; the entire contents being incorporated herein by reference.

FIELD OF THE INVENTION

This patent application relates to virtualization and more particularly to portable applications which can run on foreign operating systems and virtual machines emulating and virtualizing a reduced application programming interface required to run an application.

BACKGROUND OF THE INVENTION

Virtualization refers to the creation of a virtual (rather than actual) version, including virtual computer hardware platforms, storage devices, and computer network resources. Within the prior art techniques for virtual execution of an application include virtual machines executing upon a foreign (or non-native) operating system to that which the application was intended to execute upon (the native operating system), generating a portable application which executes upon the native operating system or executing non-native operating systems.

Each of these techniques has limitations. Accordingly, it would be beneficial to address these limitations by supporting virtualization of applications on foreign operating systems with reduced resource usage without virtualization of an entire operating system. The inventive virtualization providing creation of an isolated memory space with isolated code execution using hardware assistance.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to virtualization and more particularly to portable applications which can run on foreign operating systems and virtual machines emulating and virtualizing a reduced application programming interface required to run an application.

In accordance with an embodiment of the invention there is provided a method of establishing a virtualized application upon a computer system comprising:
   executing upon the computer system a virtualization executable application to generate a portable application for a software application; wherein
   the software application executes with a host operating system;
   the portable application executes the software application with a reduced version of the host operating system; and
   the portable application is executed with a lightweight hypervisor upon another computer system.

In accordance with an embodiment of the invention there is provided a computer system for establishing a virtualized application upon the computer system comprising:
   a microprocessor;
   a storage medium storing computer executable instructions for execution by the microprocessor; wherein
   the computer executable instructions execute a virtualization executable application to generate a portable application for a software application and a link to execute the portable application;
   the software application executes with a host operating system;
   the portable application executes the software application with a reduced version of the host operating system; and
   the portable application is executed with a lightweight hypervisor upon another computer system.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 7 depicts an exemplary process flow for a portable virtualization kernel forming part of a structure of generating and executing a portable virtualization executable application according to an embodiment of the invention supported by a virtual machine;

FIG. 8 depicts an exemplary process flow for a portable virtualization generation element forming part of a structure of generating and executing a portable virtualization executable application according to an embodiment of the invention supported by a virtual machine.

DETAILED DESCRIPTION

Figure 1:
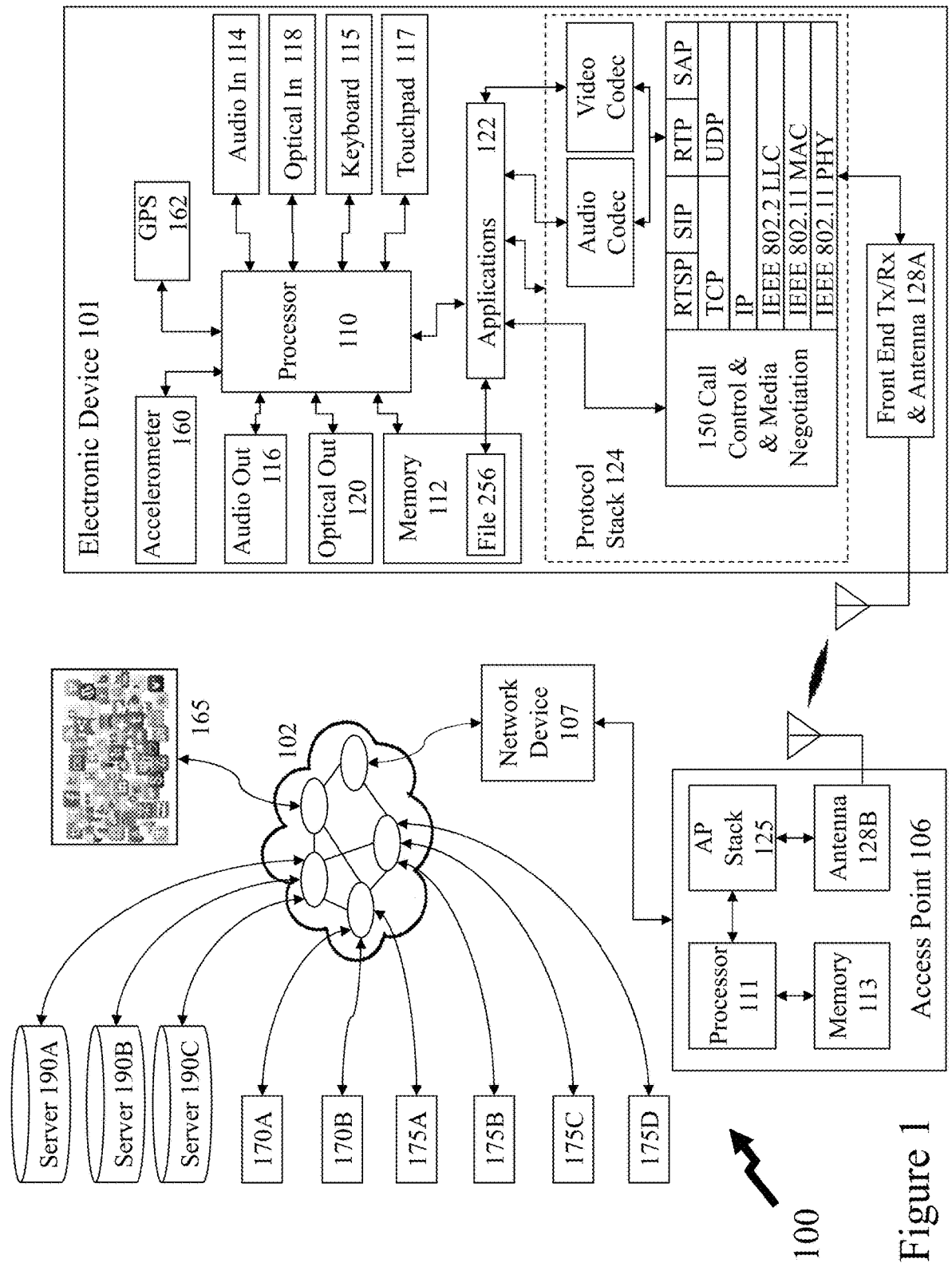
FIG. 1 depicts an exemplary electronic device and network supporting embodiments of the invention.

The present description is directed to virtualization and more particularly to portable applications which can run on foreign operating systems and virtual machines emulating and virtualizing a reduced application programming interface required to run an application.

The ensuing description provides representative embodiment(s) only, and is not intended to limit the scope, applicability, or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purposes only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers, or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

Delete Those which are not Required Once Draft Completed

A "portable electronic device" (PED) as used herein may refer to, but is not limited to, a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device, and an electronic reader.

A "fixed electronic device" (FED) as used herein may refer to, but is not limited to, a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "wearable device" or "wearable sensor" (Wearable Device) as used herein may refer to, but is not limited to, an electronic device that is worn by a user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

A "client device" as used herein may refer to, but is not limited to, a PED, FED or Wearable Device upon which a user can directly access a file or files which are stored locally upon the PED, FED or Wearable Device, which are referred to as "local files", and/or a file or files which are stored remotely to the PED, FED or Wearable Device, which are referred to as "remote files", and accessed through one or more network connections or interfaces to a storage device.

A "server" as used herein may refer to, but is not limited to, one or more physical computers co-located and/or geographically distributed running one or more services as a host to users of other computers, PEDs, FEDs, etc. to serve the client needs of these other users. This includes, but is not limited to, a database server, file server, mail server, print server, web server, gaming server, or virtual environment server.

A "software application" (commonly referred to as an "application" or "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "graphical user interface" (GUI) as used herein may refer to, but is not limited to, a form of user interface for a PED, FED, Wearable Device, software application or operating system which allows a user to interact through graphical icons with or without an audio indicator for the selection of features, actions, etc. rather than a text-based user interface, a typed command label or text navigation.

An "enterprise" as used herein may refer to, but is not limited to, a provider of a service and/or a product to a user, customer, or consumer and may include, but is not limited to, a retailer, an online retailer, a market, an online marketplace, a manufacturer, a utility, a Government organization, a service provider, and a third party service provider.

A "service provider" as used herein may refer to, but is not limited to, a provider of a service and/or a product to an enterprise and/or individual and/or group of individuals and/or a device comprising a microprocessor.

A "third party" or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals. This includes, but is not limited to, private individuals, employees of organizations and/or enterprises, members of organizations, men, and women. In its broadest sense the user may further include, but not be limited to, software systems, mechanical systems, robotic systems, android systems, etc. that may be characterised by an ability to exploit one or more embodiments of the invention. A user may also be associated through one or more accounts and/or profiles with one or more of a service provider, third party provider, enterprise, social network, social media etc. via a dashboard, web service, website, software plug-in, software application, and graphical user interface.

"Biometric" information as used herein may refer to, but is not limited to, data relating to a user characterised by data relating to a subset of conditions including, but not limited to, their environment, medical condition, biological condition, physiological condition, chemical condition, ambient environment condition, position condition, neurological condition, drug condition, and one or more specific aspects of one or more of these said conditions. Accordingly, such biometric information may include, but not be limited, blood oxygenation, blood pressure, blood flow rate, heart rate, temperate, fluidic pH, viscosity, particulate content, solids content, altitude, vibration, motion, perspiration, EEG, ECG, energy level, etc. In addition, biometric information may include data relating to physiological characteristics related to the shape and/or condition of the body wherein examples may include, but are not limited to, fingerprint, facial geometry, baldness, DNA, hand geometry, odour, and scent. Biometric information may also include data relating to behavioral characteristics, including but not limited to, typing rhythm, gait, and voice.

"User information" as used herein may refer to, but is not limited to, user behavior information and/or user profile information. It may also include a user's biometric information, an estimation of the user's biometric information, or a projection/prediction of a user's biometric information derived from current and/or historical biometric information.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed, or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g., digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

A "profile" as used herein may refer to, but is not limited to, a computer and/or microprocessor readable data file comprising data relating to settings and/or limits of an adult device. Such profiles may be established by a manufacturer/supplier/provider of a device, service, etc. or they may be established by a user through a user interface for a device, a service or a PED/FED in communication with a device, another device, a server or a service provider etc.

A "computer file" (commonly known as a file) as used herein may refer to, but is not limited to, a computer resource for recording data discretely in a computer storage device, this data being electronic content. A file may be defined by one of different types of computer files, designed for different purposes. A file can be opened, read, modified, copied, and closed with one or more software applications an arbitrary number of times. Typically, files are organized in a file system which can be used on numerous different types of storage device exploiting different kinds of media which keeps track of where the files are located on the storage device(s) and enables user access. The format of a file is typically defined by its content since a file is solely a container for data, although, on some platforms the format is usually indicated by its filename extension, specifying the rules for how the bytes must be organized and interpreted meaningfully.

A "local file" as used herein may refer to, but is not limited to, a file, i.e., electronic content, which is stored directly upon a client device, e.g., a PED, FED, or Wearable Device, within a file system of a client device.

A "remote file" as used herein may refer to, but is not limited to, a file, i.e., electronic content, which is stored externally to a client's device and is accessible either through the file system of the client device or through exploitation of one or more protocols for providing a client device with shared file access to the file stored upon a remote storage device. Storing externally to a client's device may include, but not be limited to, storing one or more files on a removable memory storage device which can be connected to the client device, for example a Universal Serial Bus memory (commonly referred to as a memory stick) or an external drive (e.g., external hard disk drive (HDD)) coupled to a wired or wireless interface of the client device. A remote storage device may include, but not be limited to, a remote HDD accessible to the client device via a network, a cloud storage account or cloud storage server accessible via a network (e.g., the Internet, Local Area Network (LAN), etc.) a remote server accessible via a network (e.g., via Ethernet, Wi-Fi, etc.).

"Metadata" as used herein may refer to, but is not limited to, information stored as data that provides information about other data and may include, but not limited to, descriptive metadata, structural metadata, administrative metadata, reference metadata and statistical metadata. Descriptive metadata may describe a resource for purposes such as discovery and identification and may include, but not be limited to, elements such as title, abstract, author, and keywords. Structural metadata relates to containers of data and indicates how compound objects are assembled and may include, but not be limited to, how pages are ordered to form chapters, and typically describes the types, versions, relationships, and other characteristics of digital materials. Administrative metadata may provide information employed in managing a resource and may include, but not be limited to, when and how it was created, file type, technical information, and who can access it. Reference metadata may describe the contents and quality of statistical data whereas statistical metadata may also describe processes that collect, process, or produce statistical data. Statistical metadata may also be referred to as process data.

A "wireless interface" as used herein may refer to, but is not limited to, an interface for a PED, FED, or Wearable Device which exploits electromagnetic signals transmitted through the air. Typically, a wireless interface may exploit microwave signals and/or RF signals, but it may also exploit visible optical signals, infrared optical signals, acoustic signals, optical signals, ultrasound signals, hypersound signals, etc.

A "wired interface" as used herein may refer to, but is not limited to, an interface for a PED, FED, or Wearable Device which exploits electrical signals transmitted through an electrical cable or cables. Typically, a wired interface involves a plug or socket on the electronic device which interfaces to a matching socket or plug on the electrical cable(s). An electrical cable may include, but not be limited to, coaxial cable, an electrical mains cable, an electrical cable for serial communications, an electrical cable for parallel communications comprising multiple signal lines, etc.

A "geofence" as used herein may refer to, but is not limited to, a virtual perimeter for a real-world geographic area which can be statically defined or dynamically generated such as in a zone around a PED's location. A geofence may be a predefined set of boundaries which align with a real world boundary, e.g., state line, country etc., or generated boundary such as a school zone, neighborhood, etc. A geofence may be defined also by an electronic device's ability to access one or more other electronic devices, e.g., beacons, wireless antennas etc.

An "artificial intelligence system" (referred to hereafter as artificial intelligence, AI)" as used herein may refer to, but is not limited to, machine intelligence or machine learning in contrast to natural intelligence. An AI may refer to analytical, human inspired, or humanized artificial intelligence. An AI may refer to the use of one or more machine learning algorithms and/or processes. An AI may employ one or more of an artificial network, decision trees, support vector machines, Bayesian networks, and genetic algorithms. An AI may employ a training model or federated learning.

"Machine Learning" (ML) or more specifically machine learning processes as used herein refers to, but is not limited, to programs, algorithms or software tools, which allow a given device or program to learn to adapt its functionality based on information processed by it or by other independent processes. These learning processes are in practice, gathered from the result of said process which produce data and or algorithms that lend themselves to prediction. This prediction process allows ML-capable devices to behave according to guidelines initially established within its own programming but evolved as a result of the ML. A machine learning algorithm or machining learning process as employed by an AI may include, but not be limited to, supervised learning, unsupervised learning, cluster analysis, reinforcement learning, feature learning, sparse dictionary learning, anomaly detection, association rule learning, inductive logic programming.

A "barcode" as used herein may refer to, but is not limited to, a method of representing data in a visual, machine-readable form. A barcode may represent data by varying the widths and spacings of parallel lines such as within linear or one-dimensional (1D) or using rectangles, dots, hexagons, and other geometric patterns, called matrix codes or two-dimensional (2D) barcodes. A barcode may comply with a standard or be application specific in order to represent the encoded alphanumeric data.

A "digital link library" (DLL) as used herein may refer to, but is not limited to, an implementation of a shared library concept for an operating system, such as Microsoft™ Windows and OS/2 operating systems, where a DLL contains software code and data that can be employed by more than one application at the same time.

A "network socket" (socket) is a software structure within a network node of a computer network that serves as an endpoint for sending and receiving data across the network. The structure and properties of a socket are defined by an application programming interface (API) for the networking architecture. Sockets are created only during the lifetime of a process of an application running in the node.

A "stack" and "heap" as used herein may refer to, but is not limited to, a linear data structure and a hierarchical data structure respectively. Stack memory will, typically, not become fragmented whereas heap memory can, typically, become fragmented as blocks of memory are first allocated and then freed. A stack accesses local variables only whilst a heap accesses variables globally.

Now referring to FIG. 1 there is depicted a schematic 100 of a network to which an Electronic Device 101 supporting Remote Access System (RAS) Systems, Applications and Platforms (SAPs) and RAS-SAP features according to embodiments of the invention is connected. Electronic Device 101 may, for example, be a PED, a FED, or a wearable device and may include additional elements above and beyond those described and depicted. Also depicted in conjunction with the Electronic Device 101 are exemplary internal and/or external elements forming part of a simplified functional diagram of an Electronic Device 101 within an overall simplified schematic of a system supporting SAP features according to embodiments of the invention which include includes an Access Point (AP) 106, such as a Wi-Fi AP for example, a Network Device 107, such as a communication server, streaming media server, and a router. The Network Device 107 may be coupled to the AP 106 via any combination of networks, wired, wireless and/or optical communication links. Also connected to the Network 102 are Social Media Networks (SOCNETS) 165; first and second remote systems 170A and 170B respectively; first and second websites 175A and 175B respectively; first and third 3rd party service providers 175C and 175E respectively; and first to third servers 190A to 190C respectively.

The Electronic device 101 includes one or more Processors 110 and a Memory 112 coupled to Processor(s) 110. AP 106 also includes one or more Processors 111 and a Memory 113 coupled to Processor(s) 210. A non-exhaustive list of examples for any of Processors 110 and 111 includes a central processing unit (CPU), a digital signal processor (DSP), a reduced instruction set computer (RISC), a complex instruction set computer (CISC), a graphics processing unit (GPU) and the like. Furthermore, any of Processors 110 and 111 may be part of application specific integrated circuits (ASICs) or may be a part of application specific standard products (ASSPs). A non-exhaustive list of examples for Memories 112 and 113 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic Device 101 may include an audio input element 214, for example a microphone, and an Audio Output Element 116, for example, a speaker, coupled to any of Processor(s) 110. Electronic Device 101 may include an Optical Input Element 218, for example, a video camera or camera, and an Optical Output Element 220, for example an LCD display, coupled to any of Processor(s) 110. Electronic Device 101 also includes a Keyboard 115 and Touchpad 117 which may for example be a physical keyboard and touchpad allowing the user to enter content or select functions within one of more Applications 122. Alternatively, the Keyboard 115 and Touchpad 117 may be predetermined regions of a touch sensitive element forming part of the display within the Electronic Device 101. The one or more Applications 122 that are typically stored in Memory 112 and are executable by any combination of Processor(s) 110. Electronic Device 101 also includes Accelerometer 160 providing three-dimensional motion input to the Processor(s) 110 and GPS 162 which provides geographical location information to Processor(s) 110. as described and depicted below in respect of FIGS. 2 and 3 respectively an Application 122 may support communications with a remote access system allowing one or more remote sessions to be established each associated with one or more Virtual Machines (VMs) allowing non-native applications (e.g., those requiring an Operating System (OS) different to that in execution upon the Processor 110) to be accessed and executed.

Electronic Device 101 includes a Protocol Stack 124 and AP 106 includes an AP Stack 125. Within Protocol Stack 124 is shown an IEEE 802.11 protocol stack but alternatively may exploit other protocol stacks such as an Internet Engineering Task Force (IETF) multimedia protocol stack for example or another protocol stack. Likewise, AP Stack 125 exploits a protocol stack but is not expanded for clarity. Elements of Protocol Stack 124 and AP Stack 125 may be implemented in any combination of software, firmware and/or hardware. Protocol Stack 124 includes an IEEE 802.11-compatible PHY module that is coupled to one or more Tx/Rx & Antenna Circuits 128A and an IEEE 802.11-compatible MAC module which is coupled to an IEEE 802.2-compatible LLC module. Protocol Stack 124 also includes modules for Network Layer IP, a transport layer User Datagram Protocol (UDP), a transport layer Transmission Control Protocol (TCP), a session layer Real Time Transport Protocol (RTP), a Session Announcement Protocol (SAP), a Session Initiation Protocol (SIP) and a Real Time Streaming Protocol (RTSP). Protocol Stack 124 includes a presentation layer Call Control and Media Negotiation module 150, one or more audio codecs and one or more video codecs. Applications 122 may be able to create maintain and/or terminate communication sessions with the Network Device 107 by way of AP 106 and therein via the Network 102 to one or more of Social Networks (SOCNETS) 165; first and second remote systems 170A and 170B respectively; first and second websites 175A and 175B respectively; first and third 3rd party service providers 175C and 175E respectively; and first to third servers 190A to 190C respectively. As described below in respect of FIGS. 2 and 3 a Remote Access System may be executed by and/or accessed by the Electronic Device 101 via the Network 102 on one or more of first and second websites 175A and 175B respectively; first and third 3rd party service providers 175C and 175E respectively; and first to third servers 190A to 190C respectively.

Typically, Applications 122 may activate any of the SAP, SIP, RTSP, and Call Control & Media Negotiation 150 modules for that purpose. Typically, information may propagate from the SAP, SIP, RTSP, Call Control & Media Negotiation 150 to the PHY module via the TCP module, IP module, LLC module and MAC module. It would be apparent to one skilled in the art that elements of the Electronic Device 101 may also be implemented within the AP 106 including but not limited to one or more elements of the Protocol Stack 124, including for example an IEEE 802.11-compatible PHY module, an IEEE 802.11-compatible MAC module, and an IEEE 802.2-compatible LLC module. The AP 106 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, and a call control & media negotiation module. Portable electronic devices (PEDs) and fixed electronic devices (FEDs) represented by Electronic Device 101 may include one or more additional wireless or wired interfaces in addition to or in replacement of the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1010, DSL, Dial-Up, DOCSIS, Ethernet, G.hn, ISDN, MoCA, PON, and Power line communication (PLC).

The Front End Tx/Rx & Antenna 128A wirelessly connects the Electronic Device 101 with the Antenna 128B on Access Point 206, wherein the Electronic Device 101 may support, for example, a national wireless standard such as GSM together with one or more local and/or personal area wireless protocols such as IEEE 802.11 a/b/g Wi-Fi, IEEE 802.16 WiMAX, and IEEE 802.15 Bluetooth for example. Accordingly, it would be evident to one skilled the art that the Electronic Device 101 may accordingly download original software and/or revisions for a variety of functions. In some embodiments of the invention the functions may not be implemented within the original as sold Electronic Device 101 and are only activated through a software/firmware revision and/or upgrade either discretely or in combination with a subscription or subscription upgrade for example. Accordingly, as will become evident in respect of the description below the Electronic Device 101 may provide a user with access to one or more RAS-SAPs including, but not limited to, software installed upon the Electronic Device 101 or software installed upon one or more remote systems such as those associated with Social Networks (SOCNETS) 165; first to fifth remote systems 170A to 170E respectively; first and second websites 175A and 175B respectively; and first to third 3rd party service provides 175C to 175E respectively; and first to third servers 190A to 190C respectively for example.

Accordingly, within the following description a remote system/server may form part or all of the Social Networks (SOCNETS) 165; first and second remote systems 170A and 170B respectively; first and second websites 175A and 175B respectively; first and third 3rd party service providers 175C and 175E respectively; and first to third servers 190A to 190C respectively. Within the following description a local client device may be Electronic Device 101 such as a PED, FED or Wearable Device and may be associated with one or more of the Social Networks (SOCNETS) 165; first and second remote systems 170A and 170B respectively; first and second websites 175A and 175B respectively; first and third 3rd party service providers 175C and 175E respectively; and first to third servers 190A to 190C respectively. Similarly, a storage system/server within the following descriptions may form part of or be associated within Social Networks (SOCNETS) 165; first and second remote systems 170A and 170B respectively; first and second websites 175A and 175B respectively; first and third 3rd party service providers 175C and 175E respectively; and first to third servers 190A to 190C respectively.

Figure 2:
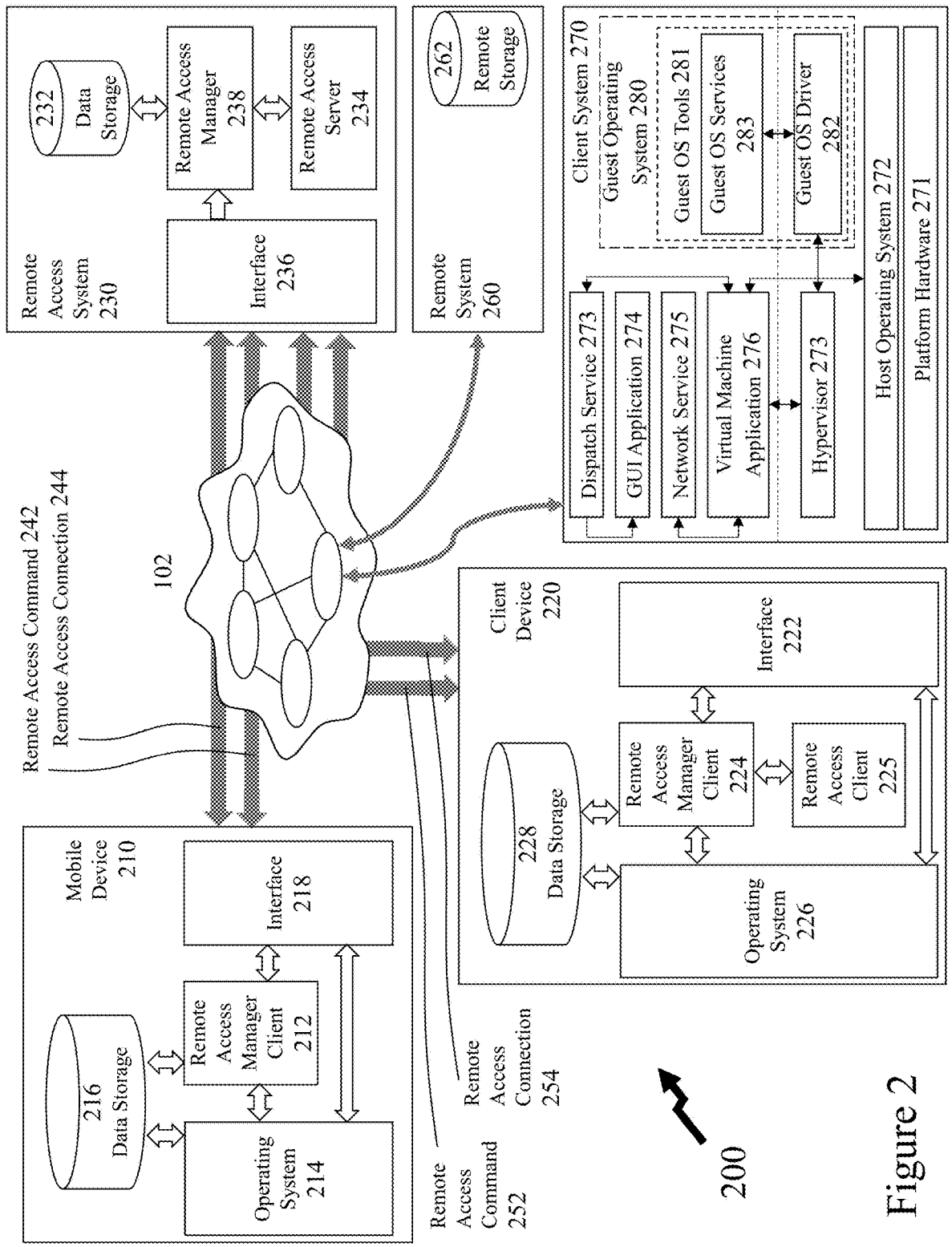
FIG. 2 depicts an exemplary block diagram of a system for initiating or transferring a portable program between a mobile client and/or a client device and a remote access system supporting embodiments of the invention.

Now referring to FIG. 2 there is depicted an exemplary block diagram 200 depicting an exemplary configuration for initiating or transferring a portable program between a Mobile Device 210 to a Remote Access System 206 and/or a Client Device 220. As depicted the Mobile Device 210 is in communication with the Remote Access System 230 over a Network 102, such as a local area network (LAN), wide area network (WAN), or the Internet. Further, the Client Device 220 is in communication with the Remote Access System 230 over the Network 102. Optionally, the remote sessions of the Mobile Device 210 and the Client Device 220 are independent sessions. Optionally, within the Remote Access System 230 may transfer a session to the Client Device 220 when the Mobile Device 210 is in proximity to the Client Device 220 where the transferred session is either configured upon an existing established session or is established by the Client Device 220 in dependence upon a communication or communications from the Remote Access System 230. Optionally, the Remote Access System 230 may transfer a session to the Mobile Device 210 from the Client Device 220 when the Mobile Device 210 is initially in proximity to the Client Device 220 and then is moved out of proximity whilst the remote session is still active, where the transferred session is either configured upon an existing established session or is established by the Mobile Device 210 in dependence upon a communication or communications from the Remote Access System 230. The Mobile Device 210 and Client Device 220 may be associated with a common user or with different users. Optionally, the Remote Access System 230 may also host and/or initiate a remote access session at a predetermined time.

The Remote Access System 230 may include one or more computing devices that perform the operations of the Remote Access System 230 and may, for example be a server such as first to third Servers 190A to 190C respectively individually or in combination. It would be evident that the Mobile Device 210 may be a PED, FED, or Wearable Device. Accordingly, with a session involving only the Mobile Device 210 and the Remote Access System 230 the session is established, maintained and terminated in dependence upon one or more Remote Access Commands 242 over a Remote Access Connection 244 between the Mobile Device 210 and the Remote Access System 230. Accordingly, with a session involving only the Client Device 220 and the Remote Access System 230 the session is established, maintained and terminated in dependence upon one or more Remote Access Commands 224 over a Remote Access Connection 254 between the Client Device 220 and the Remote Access System 230. When the session involves both the Mobile Device 210 and the Client Device 220 with the Remote Access Server then the session is established, maintained and terminated in dependence upon one or more Remote Access Commands 242 over a Remote Access Connection 244 between the Mobile Device 210 and the Remote Access System 230 and one or more Remote Access Commands 224 over a Remote Access Connection 254 between the Client Device 220 and the Remote Access System 230.

In each scenario one or more remote access sessions are established at the Remote Access System 230, either upon or in associated with a server such as first to third Servers 190A to 190C respectively in FIG. 1. The server, e.g., first Server 190A, may include one or more computing devices that perform the operations of the server. The server may be included in the Remote Access System 230 or another system that is separate and/or distinct from the Remote Access System 230 or the Remote Access System 230 may be in execution upon the server. A server application at the server initiates the one or more remote access sessions where initiating a remote access session may include, for example, executing boot-up and/or logon processes, such as running a script that automatically executes when the user logs in to the session, running applications from a folder designated as including applications to be automatically executed when the user logs in to the session, running services that automatically execute when the session starts and/or the user logs in to the session, and/or executing group policies or group policy preferences when the user logs in to the session. Alternatively, the remote access session may start the session and/or log in the user but only execute applications when these are triggered by one or more actions of the user upon the Mobile Device 210 and/or Client Device 220. In some implementations, the server application initiates the remote access session in response to determining that a remote access session has not already been initiated when a request from a device, e.g., Mobile Device 210 and/or Client Device 220, is received.

Figures 3A, 3B:
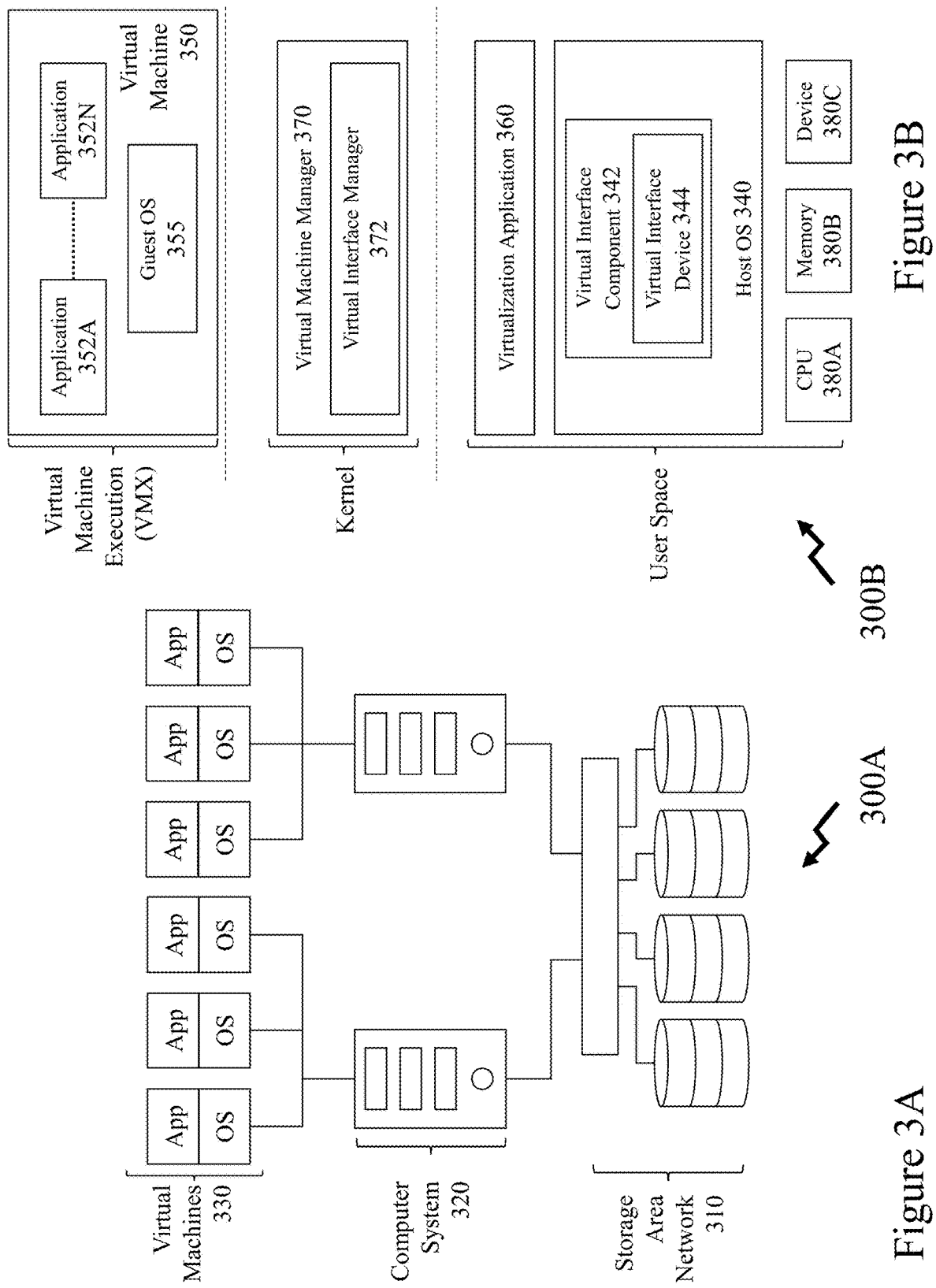
FIG. 3A depicts schematically an architecture for establishing portable applications which can be instantiated by remote access sessions according to embodiments of the invention.
FIG. 3B depicts a high-level diagram of a computer system supporting exemplary virtual machine execution environments supporting one or more aspects and/or embodiments of the invention.

A remote access session may for example be an instance of a Virtual Machines 330 and 350 as described and depicted in FIGS. 3A and 3B respectively, is an instance of a user session or profile in execution upon the Remote Access System 230 which is accessed remotely at the Mobile Device 210 and/or Client Device 220 by a client application in execution upon the respective Mobile Device 210 and/or Client Device 220. The Mobile Device 210 and/or Client Device 220 connects to the Remote Access System 230 and initiates either a new remote access session or accesses an established remote access session either in execution or suspended pending user re-initiation. The remote access session allows the Mobile Device 210 and/or Client Device 220 to access resources of the Remote Access System 230 and therein those of the server(s) forming part of server or server system associated with the Remote Access System 230, such as volatile memory (e.g., random access memory), persistent memory (e.g., a hard drive), a processor (e.g., a central processing unit (CPU) or a graphics processing unit (GPU)), a component or components of an operating system, or an application or applications such as Applications 352A to 352N respectively as depicted in FIG. 3B. One or more of these resources may be physical resources that are accessed through the remote access session (e.g., through a terminal service) and are either directly accessible to the Remote Access System 230 or accessible to the Remote Access System 230 via the Network 102 or another network to which the Remote Access System 230 is also connected. For example, the Remote Access System 230 may be in execution upon a server which forms part of a server farm wherein the Remote Access System 230 can access resources upon or associated with the other servers in the server farm. One or more of these resources may be virtual resources that are accessed through the remote access session (e.g., through remote desktop virtualization via a Virtual Machine). Optionally, the Remote Access System 230 may cause the Mobile Device 210 and/or Client Device 220 to connect to the remote access session, such that a user of the Mobile Device 210 and/or Client Device 220 may then use the remote access session to access the resources and/or applications of the server. Optionally, the user of the Mobile Device 210 and/or Client Device 220 may trigger the connection to the Remote Access System 230 to establish the remote access session so that the user of the Mobile Device 210 and/or Client Device 220 may then use the remote access session to access the resources and/or applications of the server.

Within embodiments of the invention the Mobile Device 210 and/or Client Device 220 may communicate with the Network 102 through a wireless connection, such as a terrestrial wireless communication system (e.g., a cellular data network or one or more Wi-Fi networks) or a satellite system for example. Alternatively, the Mobile Device 210 and/or Client Device 220 may communicate with the Network 102 through a wired connection, such as Ethernet or Internet over cable for example. Alternatively, the Mobile Device 210 and/or Client Device 220 may communicate with the Network 102 through a wireless connection such as depicted in FIG. 1 to a network access point (e.g., Access Point 106) and therein to the Network 102 via Network Device 107 or through a network access point directly to the Network 102.

A remote access session may be possible only within a predetermined geofence, e.g., a Mobile Device 210 associated with user of an enterprise can only successfully establish a remote access session if the Mobile Device 210 is within one or more geofences where each geofence is associated with a location of the enterprise and/or a residence of the user, for example. Similarly, Client Device 206 may be similarly geofenced such that movement of the Client Device 206 inside a geofence allows a remote access session to be established and movement of the Client Device 206 outside of the geofence prevents a remote session being established and/or terminates an existing remote session. The application(s) accessible to the user within a remote access session are determined by whether the Mobile Device 210 and/or Client Device 220 used by the user is within a geofence. A user may define the geofences themselves, e.g., their residence or set it to some default inaccessible geofence (e.g., one of zero radius or the North Pole for example) such that upon loss of the Mobile Device 210 and/or Client Device 220 access to application(s) and/or remote access sessions is prevented. The Mobile Device 210 and/or Client Device 220 may determine their location by one or more means including, but not limited to, accessing a global positioning system (GPS, such as GPS receiver 162 as depicted in FIG. 1), by triangulation with or proximity to signals from one or more antennas with known locations, such as cellular data network towers in a cellular data network or Wi-Fi devices in the Wi-Fi networks. Optionally, the Mobile Device 210 and/or Client Device 220 may establish its location by communicating with another device in its proximity, e.g., a Mobile Device 210 without a GPS may establish a personal area network connection to another device, e.g., a smartphone of the user, and therein obtain its location.

As depicted in FIG. 2 the Mobile Device 210 includes one or more Interfaces 218 to communicate with the Network 102, such as wireless interfaces to a cellular data network, a Wi-Fi network, and/or a satellite system, for example, or a wired interface to an Internet Router, for example. The Mobile Device 210 includes a Remote Access Manager Client 212 that communicates with an Operating System 214 of the Mobile Device 210, for example, to determine a location of the Mobile Device 210 or access one or more applications. an application in execution upon the Mobile Device 210 may trigger the Remote Access Manager Client 212 to access the Remote Access System 230. The Remote Access Manager Client 212 and Operating System 214 can each access Data Storage 216.

Similarly, as depicted in FIG. 2 the Client Device 220 includes one or more Interfaces 222 to communicate with the Network 102, such as wireless interfaces to a cellular data network, a Wi-Fi network, and/or a satellite system, for example, or a wired interface to an Internet Router, for example. The Client Device 220 includes a Remote Access Manager Client 224 that communicates with an Operating System 226 of the Client Device 220, for example, to determine a location of the Client Device 220 or access one or more applications. an application in execution upon the Client Device 220 may trigger the Remote Access Manager Client 224 to access the Remote Access System 230. The Remote Access Manager Client 224 and Operating System 226 can each access Data Storage 216 whilst the Remote Access Manager Client 224 may also access or communicate with Remote Access Client 225.

Similarly, as depicted in FIG. 2 the Remote Access System 230 includes one or more Interfaces 236 to communicate with the Network 102 and a Remote Access Manager 238 which communicates with Data Storage 232 that stores information that identifies or relates to a remote access session associated with the Mobile Device 210 and/or Client Device 220. As depicted the Remote Access Manager 238 communicates via Remote Access Commands 242 over Remote Access Connection 244 between its Interface 236 and Interface 236 of the Mobile Device 210. Similarly, the Remote Access Manager 238 communicates via Remote Access Commands 224 over Remote Access Connection 254 between its Interface 236 and Interface 222 of the Client Device 220. Accordingly, the Mobile Device 210 and/or Client Device 220 can send a remote access command to the Remote Access System 230 to initiate and/or connect to a remote access session or the Remote Access System can send a remote access command to Mobile Device 210 and/or Client Device 220 to initiate and/or connect to a remote access session.

As depicted in FIG. 2 the Remote Access System 230 in addition to the Remote Access Manager 238 and Data Storage 232 includes a Remote Access Server 234 which is hosted at a server that may include one or more computing devices. The server may be included in the Remote Access System 230 or be a system that is separate and/or distinct from the Remote Access System 230. The Remote Access Manager 238 may cause the Remote Access Server 234 to initiate a remote access session. Once connected, a user of the Mobile Device 210 may access resources provided by the server through the Remote Access Connection 244 to the remote access session or a user of the Client Device 220 may access resources provided by the server through the Remote Access Connection 254 to the remote access session.

Within some implementations, the Remote Access Manager Client 212 at the Mobile Device 210 and/or the Remote Access Manager Client 224 at the Client Device 220 receive an input from a user, device, and/or application that includes authentication information, such as a username, password, and/or one-time password. The Remote Access Manager Client 212 and/or the Remote Access Manager Client 224 may provide the authentication information to the Remote Access Manager 238. The Remote Access Manager 238 may condition the sending of the Remote Access Command 242 on having successfully verified authentication information received from the Mobile Device 210 or Remote Access Command 252 on having successfully verified authentication information received from the Client Device 220. This verification, being for example, against corresponding authentication information that is stored at the Remote Access System 230 in the Data Storage 232 or another memory accessible to the Remote Access System 230 (e.g., a username and/or password) and/or calculated by the Remote Access Manager 238 (e.g., a one-time password). In some implementations, the authentication information may include information from a scanner/device, such as biometric data from a biometric scanner and/or biometric device (e.g., a fingerprint, facial scanner, or credential data of the user from a card scanner and/or reader device (e.g., as employed for access control), associated with the Mobile Device 210 and/or Client Device 220 or a location such as a worksite, office, enterprise access point etc. The information provided to the Remote Access System 230 by the Mobile Device 210 and/or Client Device 220 retrieved from the scanner/device may also include information that identifies a user account associated with the successful verification of the user or is retrieved from another system in dependence upon the information retrieved from the scanner/device. This information may be provided as obtained or as processed by a system such as the user's electronic device, e.g., Mobile Device 210 or Client Device 220. This information provided to the Remote Access System 230 may also include information that identifies the scanner/device as well as time and/or date of the information being acquired and/or geographic location information of the scanner/device location, such a verification providing an alternate means of restricting remote access sessions and/or application executable within a remote access session to geofencing.

In response to successfully verifying the received authentication information, the Remote Access Manager 238 may perform a transformation on the received authentication information and/or additional information, such as by creating a hash of the information, to generate a key. The Remote Access Manager 238 may provide the key to the Remote Access Manager Client 212 at the Mobile Device 210 and/or the Remote Access Manager Client 224 at the Client Device 220. The Remote Access Manager Client 212 may store the key in a Data Storage 216 at the Mobile Device 210. The Remote Access Manager Client 224 may store the key in a Data Storage 228 at the Client Device 220. Alternatively, the Remote Access Manager Client 212 and/or the Remote Access Manager Client 224 may perform a transformation on the authentication information and/or additional information to generate the key and store the key in the Data Storage 216 and/or the Data Storage 228, respectively. The Remote Access Manager Client 212 may provide the key and/or a reverse of the transformation of the key to the Remote Access System 230 for authentication of the Mobile Device 210 by the Remote Access System 230. The Remote Access Manager Client 224 may provide the key and/or a reverse of the transformation of the key to the Remote Access System 230 with subsequent checks for remote access commands for authentication of the Client Device 220 by the Remote Access System 230. The communications between the Mobile Device 210, the Remote Access System 230, and/or the Client Device 220 over the Network 102 may be encrypted.

The authentication information used for authenticating the Remote Access Manager Client 224 at the Client Device 220 with the Remote Access Manager 238 at the Remote Access System 230 may be the same authentication information that is used to authenticate the Remote Access Client 225 with the Remote Access Server 234 or alternatively it may be separate and/or distinct.

In response to the Remote Access Manager Client 224 receiving the Remote Access Command 254, the Remote Access Manager Client 224 may instruct the Remote Access Client 225 to connect to the remote access session provided by the Remote Access Server 234 in the background of a user profile for the Client Device 220. Optionally, a user interface of the Client Device 220 may be locked requiring the user to provide authentication information to the Client Device 220 to unlock the user interface for the user profile where the Remote Access Client 225 establishes the Remote Access Connection 244 to the remote access session. Similarly, Remote Access Manager Client 212 receiving the Remote Access Command 242, the Remote Access Manager Client 212 may connect to the remote access session provided by the Remote Access Server 234 in the background of a user profile for the Mobile Device 210. Optionally, a user interface of the Mobile Device 210 may be locked requiring the user to provide authentication information to the Mobile Device 210 to unlock the user interface for the user profile where the Remote Access Manager Client 212 establishes the Remote Access Connection 254 to the remote access session.

The Remote Access Manager 238 may send a command to the Remote Access Server 234 to disconnect from a remote access session, for example, once the Remote Access Manager 238 has verified that the Remote Access Server 234 has completed a remote access session or upon receiving a Remote Access Command 242 from Mobile Device 210 or Remote Access Command 254 from Client Device 220 to terminate a remote access session, the Remote Access Manager 238 and/or Remote Access Server 234 may receive a Remote Access Command 242 from Mobile Device 210 or Remote Access Command 254 from Client Device 220 to log-off a remote access session such that the associated Remote Access Connection 244 or 232 is terminated but the processing upon the Remote Access System 230 and/or Remote Access Server 234 is not terminated. Accordingly, a remote access session may be initiated to establish a process, e.g., a numerical simulation within a computer aided design application, where the connection is not required to be maintained until the user wishes to access the results of the process. Similarly, the Remote Access Manager 238 and/or Remote Access Server 234 may receive a Remote Access Command 242 from Mobile Device 210 or Remote Access Command 254 from Client Device 220 to suspend a remote access session such that the associated Remote Access Connection 244 or 232 is terminated and the processing upon the Remote Access System 230 and/or Remote Access Server 234 suspended pending subsequent re-initiation of the remote access session.

Also depicted with respect to schematic diagram 200 in FIG. 2 are a Remote System 260 and Client System 270. The Client System 270 supporting virtual machine software, such as Parallels® Desktop for example, for running software of one operating system (Guest Operating System 280), upon the Client System 270 which employs another operating system (Host Operating System 272) upon Platform Hardware 271 of the Client System 270. Accordingly, installed upon the Client System 270 is a hardware emulation virtualization software that uses hypervisor technology to run an unmodified copy of the Guest Operating System (Guest OS) 280, e.g. designed for an Intel-compatible CPU (e.g., Windows), side by side with the Host Operating System (Host OS) 272 (e.g. Apple® OS X). The Guest OS 280 executes inside a virtual machine by means of the Hypervisor 273, e.g. Parallels® Hypervisor, that works by mapping the Client System 270 hardware resources, e.g. an Apple® Mac computer, directly to the virtual machine's resources. The Hypervisor 273 leveraging features of a hardware virtualization assistance embedded within an Intel CPU, e.g. VT-x, EPT, etc. Each virtual machine (VM) established operating identically to a stand-alone computer, with virtually all the resources of the physical computer, Client System 270. In this manner the VM is able to virtualize a full set of standard PC hardware upon a non-PC platform.

As depicted the VM software installed upon the Client System 270 comprises the Hypervisor 273, a VM Application 276, Guest OS Tools 281, a Dispatch Service 273, a GUI Application 274, and a Network Service 274. The Guest OS Tools 281 being executed within the VM upon the Guest OS 280.

The Hypervisor 273 provides a host kernel module employed to create and execute VMs. The Hypervisor 273 mapping the Client System 270 hardware resources directly to the VM's resources. By using CPU virtualization hardware support, the Hypervisor 273 traps and emulates Guest OS 280 access to the Client System hardware (e.g. Platform Hardware 271 elements such as CPU, timer, interrupt controller, network, disk, sound, etc.), and intercepts and processes some CPU instructions and memory access faults originating within the VM. By leveraging Extended Page Tables (EPT), the Hypervisor 273 controls attempts of the Guest OS 280 to access the physical memory of Client System 270, preventing the Guest OS 280 from accessing arbitrary physical memory pages besides those allocated for it by the Hypervisor 273. In this manner the Hypervisor 273 ensures that the Guest OS 280 executes isolated from the Host OS 272 and does not access an arbitrary memory location or executes unsafe CPU instructions outside the VM that could result in unauthorized access or disruption of host data and/or disordering a normal behavior of the Host OS 272.

The Virtual Machine Application 276 communicates with the Hypervisor 273 and Host OS 272 in order to perform several functions including, loading a VM into the memory with the help of Hypervisor 273; managing the lifecycle of the executed VM and its states (e.g., start/stop/pause/restart/ shutdown VM, create a snapshot, revert to snapshot, etc.), emulating VM devices (e.g. CPU, timer, interrupt controller, network, disk, sound, etc.), and processing requests for execution of operations on virtual devices signaled by the VM through the Hypervisor 273 and mapping results back to the VM via the Hypervisor 273.

A VM Application 276 may be started by the Host OS 272 and run as a regular process such that it falls under all the regular process restrictions like virtual memory space isolation, file permissions etc., as with any other system process.

The VM Application 276 is the only process that communicates with the Guest OS 280 that runs inside the VM, through the hypervisor API. Operations inside the VM requiring access to a real device are redirected by the Hypervisor 273 to the VM application in the Host OS 272 which is then emulated by the VM Application 276.

Typically, when executing device commands translated from the VM by the Hypervisor 273, the VM Application 276 accesses only a limited set of Host OS 272 files which emulate virtual devices included in the VM configuration, e.g., virtual hard disks image files; such that it does not enable the Guest OS 280 to access arbitrary Host OS 272 files. The VM Application 276 emulates operations on virtual devices requested by the Guest OS 280, in a user mode context such that the Guest OS 280 does not have access to the host kernel and/or any other system process/file or their memory in Host OS 272 directly through virtual devices.

Guest OS Tools 281 provides a suite of special utilities that enable tight integration between the Host OS 272 and the Guest OS 280 such that the user can access and exploit the VM(s) in a comfortable and efficient manner. One such aspect being sharing files and applications allowing users to easily access their Host OS 272 files using Guest OS programs, and also to access Guest OS 280 files using Host OS 272 applications. Optionally, documents from both Host OS 272 and Guest OS 280 may be stored within the same folder. As depicted the Guest OS Tools 281 comprises a Guest OS Services 283 element and one or more Guest OS Drivers 282.

Dispatch Service 273 provides a management component of the VM software which is responsible for managing a VM directory (registering/unregistering VMs), creating the VM's resources (e.g. configuration files, hard disk image files, etc.) in the Host OS 272 file system, committing changes in VM configuration files as requested, processing commands and events that help manage a VM lifecycle, received from the GUI Application 274 and the VM Application 276, providing a communication channel between the VM application and the GUI application, and enabling the exchange of data (e.g. commands, keyboard, and mouse input data travel from the GUI Application 274 to the VM Application 276 and events from the VM Application 276 back to the GUI Application 274.

Optionally, the Dispatch Service 273 runs as a system service (daemon) with root privileges communicating with the GUI Application 274 and VM Application 276 through a Unix domain (IPC) socket, for example. The Dispatch Service 273 also facilitates a direct connection between the GUI Application 274 and the VM Application 276 through this socket whilst utilization of the Unix domain socket makes communications secure as this kind of socket exists only inside a single computer. Accordingly, the Dispatch Service 273 communications cannot be eavesdropped on by an untrusted network, and remote computers cannot connect to it without some sort of forwarding mechanism. Typically, the Dispatch Service 273 is designed to process only a limited set of commands from the GUI application, commands that target management of a VM directory and individual VMs.

The Network Service 275 enables various types of networking to VMs such as a Shared Network, wherein the Guest OS 280 shares a network connection with the Host OS 272 such that the Guest OS 280 and Host OS 272 appear as a single entity in the external network, a bridged network wherein the Guest OS 280 can use one of the Client System 270 network adapters such that the Guest OS 280 appears as a separate computer on the network, and a host only network, where the Guest OS 280 cannot access any external networks, only the Client System 272.

The GUI Application 274 provides a GUI through which a user creates a VM, manages its state (start/stop/pause/resume/shutdown, etc.), and operates with the Guest OS 280 virtual display that shows the user interface of the Guest OS 280. A GUI Application 274 may run as a regular Host OS 272 process with the privileges of the current user and establishes a connection to the Dispatch Service 273 using the Unix domain socket, through which it sends commands and receives events that enable managing within, to and from a VM. It also establishes, in conjunction with Dispatch Service 273, a direct connection via a Unix domain socket to the VM application process, through which it transmits keyboard and mouse input to the VM. In some instances regardless of a VM view mode of the GUI Application 274, the Guest OS 280 and its applications remain running in an isolated VM environment controlled by the Hypervisor 273. Generally, the GUI Application 274 does not communicate directly with the Guest OS 280 and does not access any guest OS data directly, except the shared video memory buffer. It is further typically not designed to accept and execute commands from a VM application and/or the Guest OS 280.

As depicted in FIG. 2 the Client System 270 may communicate with a Remote System 260 via the Network 102. The Remote System 260 comprising at least a Remote Storage 262. Remote System 260 may be discrete from Remote Access System 230 or it may form part of an overall remote service in conjunction with the Remote Access System 230. Accordingly, executing an application upon the Client System 270 communications are established with the Remote System 260 such that, for example, a trial license key for the Client System 270 may be requested, the user and/or Client System 270 registered with the Remote System 270 to execute the VM software upon the Client System 270, periodically validate a license key and update a license key, check/download software updates, report problems, access electronic content stored within the Remote Storage 262, access complimentary products etc.

Client System 270 may also support similar software and functionality as Client Device 220 and/or Mobile Device 210 allowing it support both VMs directly established upon itself or VMs indirectly established upon Remote Access System 230.

Referring to FIG. 3A there is depicted schematically an architecture for establishing portable applications which can be instantiated by remote access sessions according to embodiments of the invention. As depicted a plurality of virtual machines (VMs) 130 are associated with a plurality of Computer Systems 320 which are themselves associated with a storage area network (SAN) 310. The plurality of Computer Systems 320 may be directly connected or indirectly connected via one or more communications networks to the 310, such as Network 102 in FIGS. 1 and 2. Accordingly, each VM 130 may employ virtual memory pages which are mapped to physical memory pages upon the 310. A Computer System 320 may be connected to one or more SANs 110. Whilst the descriptions in respect of FIGS. 3A to 3B are described with respect to a Computer System 320 hosting one or more VMs 330 it would be evident that these may be supported by a PED, a FED, a WED, a server or a WES directly or indirectly through communications within one of the plurality of Computer Systems 320. A computer system 320 may itself be a PED, a FED, a WED, a server, or a WES. Accordingly, a computer system 320 may, as depicted in FIG. 3B, support a virtual machine execution (VMX) environment as a host system directly or indirectly or it may include a virtual machine monitor (VMM) facilitating execution of one or more VMs, each of which may, as depicted in FIG. 3B, run a guest operating system (OS) 355 to manage one or more Guest Applications 352A to 352N respectively. Accordingly, a Computer System 320 may be a Remote Access System 230 and SAN 310 may be Data Storage 232 as depicted in FIG. 2. In this manner, a remote session established by a user may support one or more VMs 330 and therein a guess OS 355 and one or more Guest Applications 352A to 352N as depicted in FIG. 3B.

FIG. 3B depicts a high-level diagram of a computer system (host system) 300B supporting exemplary VMX environments supporting one or more aspects and/or embodiments of the present disclosure. The Host System 300B, e.g., Computer System 320 in FIG. 3A or Remote Access System 230 in FIG. 2, may include one or more central processing units (CPU) 380A communicatively coupled to one or more memory devices 380B and one or more peripheral devices 380C via a system bus, not depicted for clarity. The Host System 300B may implement a virtual execution environment for executing the software developed for a platform that is different from the native platform of the Host System 300B. In certain implementations, the virtual execution environment may be implemented using certain hardware-assisted virtualization features of the CPU 180A, which may support executing, at an elevated privilege level one or more elements, including but not limited to, a VMM 370 that manages one or more VMs. In various implementations, the VMM 370 may be implemented as a kernel module, a kernel extension, a driver, or a part of the Host Operating System (OS) 340. The Host OS 340 may further include a virtual interface component 142 which virtualizes a virtual interface component 142 to manage one or more Virtual Interface Devices 344 for use by the VM 350 and/or Host OS 340.

The VMM 370 may present a VM 350 with an abstraction of one or more virtual processors, while retaining selective control of processor resources, physical memory, interrupt management, and input/output (I/O). The VMM 370 may also present a VM 350 with an abstraction of one or more Virtual Interface Devices 344 of the Virtual Interface Component 342. A VM 350 may implement a software environment which may be represented by a stack including a Guest OS 355 and one or more applications 155A-155N. Each VM 350 may operate independently of other VMs and use the VMM-facilitated interface to the processors, memory, storage, graphics, and I/O provided by the Host System 300B. The VMM 370 may include a Virtual Interface Manager 372 to receive instructions to create a communication channel between a Host OS 340 and a Guest OS 355. The Virtual Interface Manager 372 may also send a request to Host OS 340 to create a Virtual Interface Device 344 and provide the Virtual Interface Device 144 to Guest OS 355. In considering VMX operation then there are two kinds of VMX operation commonly referred to, namely VMX root operation and VMX non-root operation. In general, a VMM, such as VMM 370 in FIG. 3B, will run in VMX root operation and guest software, such as Guest OS 355 and Applications 352A to 352N will run in VMX non-root operation. Transitions between VMX root operation and VMX non-root operation are called VMX transitions. There are two kinds of VMX transitions, those into VMX non-root operation from VMX operation are called VM entries whilst those from VMX non-root operation to VMX root operation are called VM exits.

Accordingly, a user may, for example, remotely access from either their PED, e.g., Mobile Device 210 in FIG. 2, and/or FED, e.g., Client Device 220 in FIG. 2, applications upon a remote system, e.g., Remote Access System 230 in FIG. 2, wherein a remote session they establish instantiates one or more instances of a Virtual Machine, such as Virtual Machine (VM) 350 in FIG. 3, to execute the application(s) the user wishes to execute. By virtue of exploiting VMs 350 then the operating system for these applications may be different from or the same as that of the operating system of the user's electronic device. Accordingly, the VM 350 operating system, Guest OS 355, for each VM 350 instantiated may be established as one of Linux, Windows, Android, and iOS, for example, which may be the same as or different to the operating system of the user's device, e.g., Mobile Device 210 or Client Device 220.

Embodiments of the invention support creation of portable programs, that can run on foreign (non-native) operating systems, but without the significant resource overhead of prior art virtual machines due to their requirement for foreign operating system (OS) virtualization. For example, embodiments of the invention provide the ability to run applications, e.g., Microsoft™ Windows applications on Apple™ MacOS, but without requiring installation of the full operating system, in this instance Microsoft™ Windows, as a virtual machine. Accordingly, embodiments of the invention provide for emulating and virtualizing a reduced application programming interface (API) required to run the particular application.

Accordingly, embodiments of the invention address the problem of using applications on foreign operating systems, but with minimal resource usage, allowing the applications to be supported in environments which would not support virtualization of the whole OS, which is usually not required in case of executing a single application. Such environments including, but not limited to, portable electronic devices (PEDs), wearable devices, etc. Accordingly, embodiments of the invention exploit virtualization in a minimal configuration to support the creation of an isolated memory space with isolated code execution using hardware assistance.

Within the prior art there are several approaches to achieving virtualization including:
- Employing a full standard virtual machine (VM) running a foreign OS and running the required application in it, examples of such an approach include virtual machine (VM) software solutions such as Parallels™ Desktop, VMware™ Fusion/Workstation and Oracle™ VM Virtualbox.
- Generating a portable application inside the same OS as that for which the application was designed which emulates and virtualizes all of the required API for the application, examples of such an approach include Turbo.net™ Turbo Studio and VMware™.
- Emulating a reduced API without virtualization technologies but executing foreign OS programs, examples include "Wine Is Not an Emulator" (Wine) and DOS-Box.

The first prior art method, a full standard VM, requires significant resource overhead even if the user wants to run a light application, e.g., Notepad (a simple text editor for Microsoft™ Windows) as it requires installation of the whole Microsoft™ Windows OS, requiring substantial random access memory (RAM) and disk space for the unnecessary files for running the whole OS. This approach also requires, in many instances, establishment of an initial configuration of the OS to be able to run anything on it. The second prior art method whilst generating a small portable program does not allow it to be executed upon a foreign OS. Accordingly, in the example above the user cannot run the portable version of Notepad for Microsoft™ Windows (hereinafter Windows) in Apple™ MacOS (hereinafter MacOS), whilst the portable version of Notepad would not require the whole OS emulation to be executed. The third prior art method does not exploit hardware virtualization techniques thereby resulting in slower program execution times, as there is no support from the central processing unit (CPU). Further, there is no ability to create true portable applications as there is still the requirement to configure the system to be able to run.

Accordingly, the inventors have established a methodology wherein a combination of user space API interception and emulation with hardware virtualization provide for the creations of portable virtual appliances (or applications) to execute a particular software application upon a foreign OS without substantial resource overhead as required with prior art virtualization of the whole OS.

Accordingly, embodiments of the invention exploit software solutions to analyze API dependencies for a software application, including system calls, interrupts, memory layout and create a dedicated minimal virtual machine to run this software application with reduced OS interfaces to reduce resource overhead. Such a dedicated virtual machine thereby allowing the full appliance (application) to be portable as it is does not depend upon the whole OS installation.

Accordingly, embodiments of the invention as described and depicted with respect of FIG. 2 the Portable Application may be generated upon and executed upon the Client System 270. This is anticipated, by the inventors, as being a typical deployment method of embodiments of the invention.

Optionally, the Portable Application may be generated and executed upon the Client System 270 but may be stored, for example, within Remote Storage 262 of Remote System 260 for subsequent retrieval and execution upon the Client System 270.

Optionally, a memory (or cache) may store previously generated Portable Applications and an index of these with an association to the application to which they relate together with data identifying the feature(s), aspect(s) of the application. Accordingly, subsequently prior to generating a new Portable Application for execution within a virtual machine (VM) a software application, forming part of the VM, an operating system, or the application, for example, may search this index to establish whether a Portable Application providing the required feature(s) and/or aspect(s) already exists which may be executed rather than generating a new Portable Application.

However, within other embodiments of the invention a Portable Application may be generated upon the Remote System 260 and transferred to the Client System 270 for execution or generated upon the Client System 270 and transferred to the Remote Access System 230, for example, for execution.

Alternatively, within other embodiments of the invention a Portable Application may be transferred from a host system upon which it is generated, e.g. Remote Access System 230, so that rather than being executed upon the Remote Access System 230, is transferred to and executed upon another Remote Access System 230, or a user PED or FED, e.g. Mobile Device 210, Client Device 220 or Client System 270, as described above, according to the operating system of the respective other Remote Access System 230, Mobile Device 210, Client Device 220 or Client System 270.

Figure 4A:
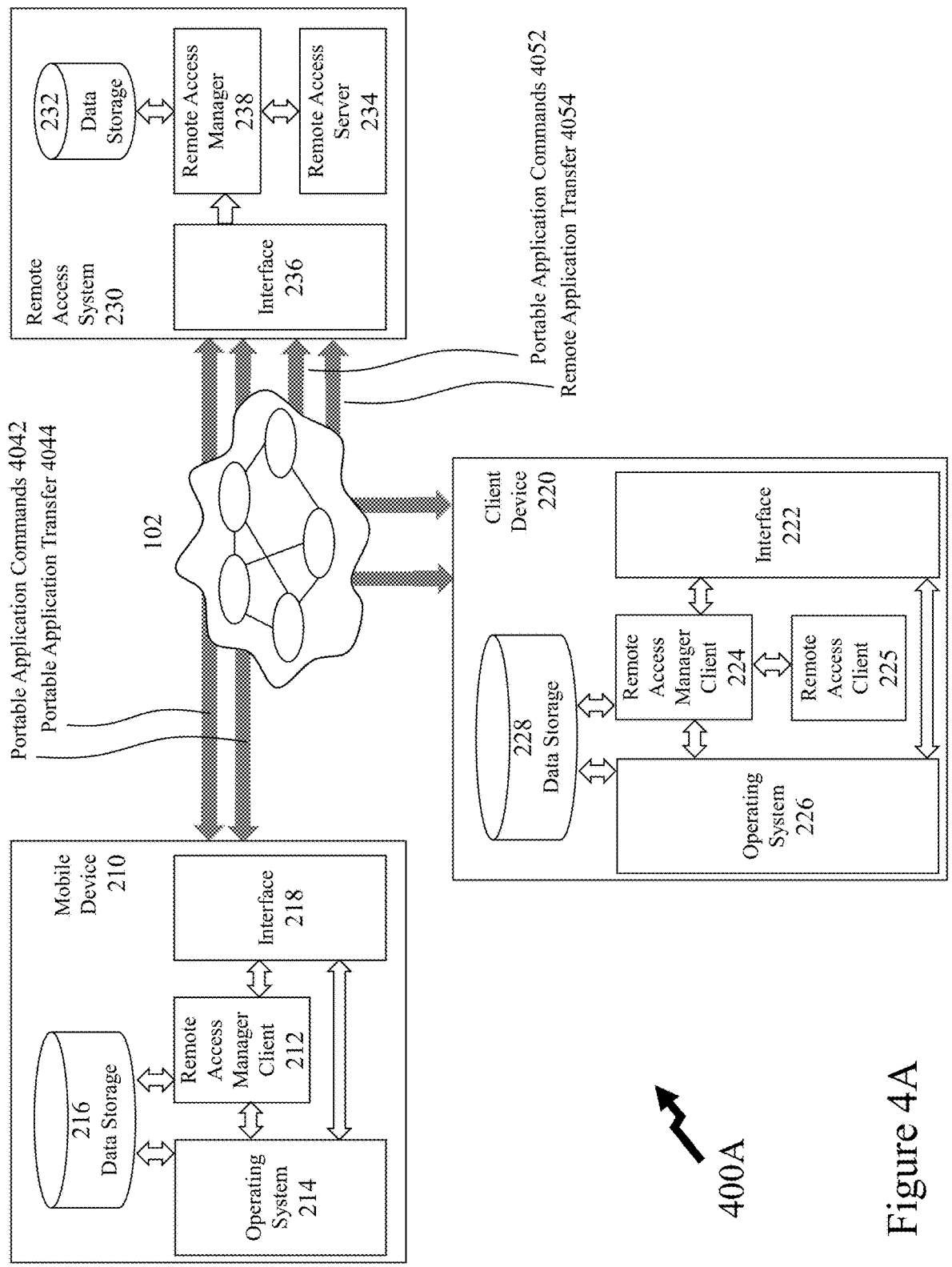
FIG. 4A depicts an exemplary block diagram of a system for initiating and transferring a portable program between a mobile client and/or a client device and a remote access system supporting embodiments of the invention.

Accordingly, within an embodiment of the invention, referring to FIG. 4A, the Mobile Device 210 communicates with the Remote Access System 230 with Portable Application Commands 4042 thereby triggering, if it has not already been generated, execution of the Portable Virtualization Executable Application 410 to generate the Portable Application for the application. Once generated the Portable Application when accessed exploits a generated link to instruct the application to execute from the prepared library and a lightweight hypervisor. If the Portable Application has been previously generated the Portable Application Commands 4042 either trigger the Portable Application to be executed upon the Remote Access System 230 or transferred and executed upon another device, e.g., another Remote Access System 230 or Client Device 220. For example, the transfer of the Portable Application may be performed through Portable Application Transfer 4054 wherein the Portable Application is transferred to and executes upon the Client Device 220.

Figure 4B:
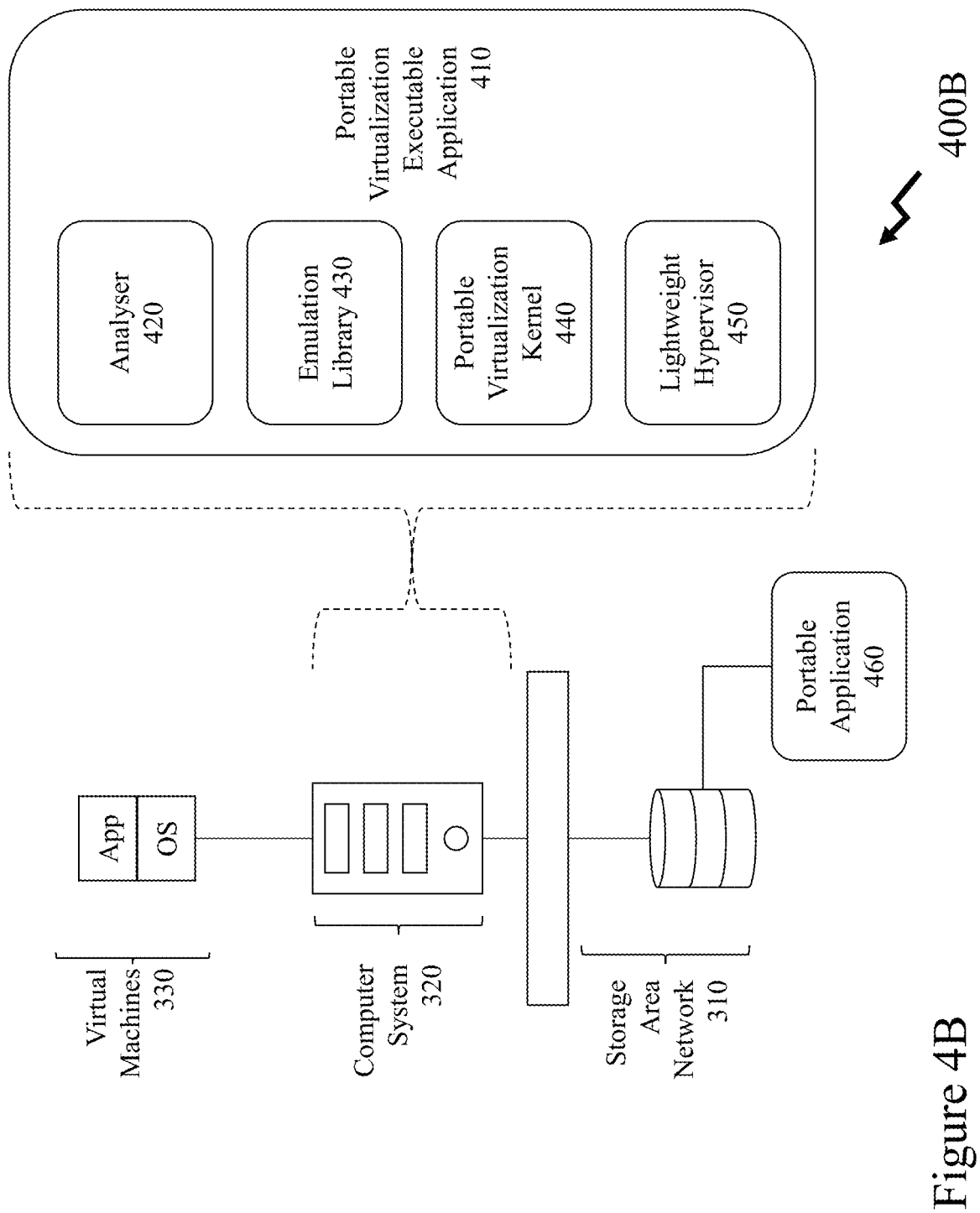
FIG. 4B depicts an exemplary schematic of a structure of generating and executing a portable virtualization executable application according to an embodiment of the invention supported by a virtual machine.

Alternatively, within another embodiment of the invention, referring to FIG. 4B, the Client Device 220 communicates with the Remote Access System 230 with Portable Application Commands 4052 thereby triggering, if it has not already been generated, execution of the Portable Virtualization Executable Application 410 to generate the Portable Application for the application. Once generated the Portable Application when accessed exploits a generated link to instruct the application to execute from the prepared library and a lightweight hypervisor. If the Portable Application has been previously generated the Portable Application Commands 4052 either trigger the Portable Application to be executed upon the Remote Access System 230 or transferred and executed upon another device, e.g., another Remote Access System 230 or Mobile Device 210. For example, the transfer of the Portable Application may be performed through Portable Application Transfer 4044 wherein the Portable Application is transferred to and executes upon the Mobile Device 210.

Optionally, within another embodiment of the invention the execution of the Portable Application may be triggered upon another device other than Mobile Device 210 and Client Device 220 wherein the Portable Application is executed upon the Remote Access System 230 or Mobile Device 210 and/or Client Device 220.

If, the Mobile Device 210 and Client Device 220 have the same operating system as that supporting the Portable Application and the Portable Application has been transferred to the Mobile Device 210 then the Portable Application may be transferred from the Mobile Device 210 to the Client Device 220 such as described above in respect of FIG. 2 wherein the Mobile Device 210 communicates with the Remote Access System 230 with, e.g. Portable Application Commands 4052, thereby triggering transfer of the Portable Application with Portable Application Transfer 4054 wherein the Portable Application subsequently executes upon the Client Device 220. In this scenario the Remote Access System 230 maintains a status of the Portable Application upon the Mobile Device 210 and Client Device 220 through the Portable Application Commands 4042 and Portable Application Commands 4052 respectively such that the status of the Portable Application is transferred with the Portable Application when the Portable Application is transferred from the Mobile Device 210 to the Client Device 220.

If, the Mobile Device 210 and Client Device 220 have the same operating system as that supporting the Portable Application and the Portable Application has been transferred to the Client Device 220 then the Portable Application may be transferred from the Client Device 220 to the Mobile Device 210 such as described above in respect of FIG. 2 wherein the Client Device 220 communicates with the Remote Access System 230 with, e.g. Portable Application Commands 4052, thereby triggering transfer of the Portable Application with Portable Application Transfer 4054 wherein the Portable Application subsequently executes upon the Mobile Device 210. In this scenario the Remote Access System 230 maintains a status of the Portable Application upon the Mobile Device 210 and Client Device 220 through the Portable Application Commands 4042 and Portable Application Commands 4052 respectively such that the status of the Portable Application is transferred with the Portable Application when the Portable Application is transferred from the Client Device 220 to the Mobile Device 210.

Within another scenario the embodiment of the invention as described with respect to FIG. 2 executes but now instead of a full virtualization being established upon the Remote Access System 230 the Portable Application is established upon the Remote Access System 230. In this manner, the Remote Access System 230 may support a larger number of concurrent VMs than would be possible with full OS virtualizations.

Optionally, the Remote Access System 230 may, as described below, execute a process according to an embodiment of the invention to establish a Portable Application upon establishing a requirement from a user to establish a VM for a single application which is then subsequently stored and retrieved for subsequent VMs for that single application. It would be evident that the Portable Application once generated may be stored within Data Storage 232 of Remote Access System 230 or within a storage accessible to the Remote Access System 230 and other remote access systems.

Optionally, the Remote Access System 230 may establish a list of applications for which Portable Applications have been established for and execute these in each instance of a VM being established which requests an application for which a Portable Application exists. This may be employed as a separate VM hosted by the Remote Access System 230 but the user upon the Mobile Device 210 and/or Client Device 220 is unaware that that specific application they have requested is executed as Portable Application rather than a full VM.

Optionally, within embodiments of the invention a user may establish a VM and request two or more applications which can each be supported by their respective Portable Application. In this scenario the Remote Access System 230 may establish multiple Portable Applications to execute the applications for the user but render them to the user as if they were within a full (single) VM so that the use of Portable Applications is transparent to the user.

Optionally, rather than a full software application, such as Notepad being supported by a Portable Application, another application may be provided with reduced functionality and/or features through a Portable Application. For example, an application such as Word may be employed upon a PED, e.g., Mobile Device 210, with reduced functionality through a Portable Application but if the user transfers to a FED, e.g., Client Device 220, then a full functionality version of Word is provided to the user through a standard VM. Accordingly, based upon the user's access to the Remote Access System 230 the VM provided to the user may initially be a Portable Application wherein they are transparently transferred to a full VM or it may initially be a full VM wherein they are subsequently transferred to the Portable Application.

Optionally, a software application may be provided to users through multiple Portable Applications each one supporting different subsets of the full software application functionality for heavier applications such as Word, PowerPoint, etc. rather than lighter applications such as Notepad, etc.

Optionally, a Portable Application may be executed upon the same electronic device from which the user requests it where the electronic device supports multiple partitions for executing two or more operating systems wherein the Portable Application may be downloaded from a Remote Access System upon which it is generated and stored for execution upon the electronic device. The application when selected may be run through the partition for the foreign OS of the Portable Application. Beneficially, the reduced memory and resource requirements allow the Portable Application to be executed upon the electronic device, e.g., a PED, where full OS virtualization cannot be supported due to memory and/or resource constraints. Optionally, within embodiments of the invention the electronic device may temporarily terminate activities within the host OS from which the user calls the application to execute the Portable Application. Optionally, within embodiments of the invention the reduced foreign OS may be executed concurrently with the host OS if the memory and/or resource profiles of the electronic device support this together with the appropriate configurations etc.

Now referring to FIG. 4B there is depicted an exemplary schematic 400B of a structure of generating and executing a portable virtualization executable application according to an embodiment of the invention supported by a computer system, for example Remote Access System 230 in FIGS. 2A and 4A respectively, and Computer System 320 in FIG. 3A. The Computer System 320 supporting Virtual Machines 330 and accessing data stored within Storage Area Network 310. The Computer System 320 executing Portable Virtualization Executable Application 410 which is depicted as comprising four elements:

First element, Analyser 420;
Second element, Emulation Library 430;
Third element, Portable Virtualization Kernel 440; and
Fourth element, Lightweight Hypervisor 450.

The Portable Virtualization Executable Application 410 generates the Portable Application 460, such as the Portable Application described with respect to FIG. 4A.

The Analyser 420 runs, either upon the native operating system (OS) of the Computer System 320 or a foreign operating system (OS) upon the Computer System 320 via a Virtual Machine 330, in order to establish the necessary hooks to the application. The Analyser 420 inspects the application and establishes which components are required and used by the application. These components may include, but are not limited to, dynamic link libraries (DLLs), registry keys, files, directories, sockets, console input, console output, and visual elements such as windows, menus, dialogs, buttons, etc.

The Emulation Library 430 comprises the special translation and emulation libraries required to translate system calls from one OS (e.g., the host OS or foreign OS) to another (e.g., the other of the host OS and foreign OS or another foreign OS) in order to emulate the required foreign OS behavior in host OS with respect to, for example, files, directories, access rights, registry keys, console input/output, visual interfaces, etc. Within the Emulation Library 430 is an application binary interface (ABI) translation proxy, which converts executable code with the system calls for the foreign OS to host system calls and return parameters back to the original code. The Emulation Library 430 consists of two main portions, a host OS portion and a foreign OS portion, which interchange data through a standard interface used by the virtual machine, e.g., through VMCALL instructions and access to shared memory space.

The Portable Virtualization Kernel 440 is executed by a hypervisor to support memory space layout and executable code isolation. The Portable Virtualization Kernel 440 comprises an initial setup sequence for system registers, creation of a memory layout for the application (for which the Portable Application is being created), the hooking necessary for system calls, interrupts, etc. for the foreign application (application for which the Portable Application is being created) as well as VMCALL proxy code for transferring data from the foreign application and/or operating system into the host operating system and vice-versa. The Portable Application Kernel 440 therefore comprises a small OS which does not provide any resource management (e.g., CPU, memory, power, etc.) as a full OS would as it is used only for hooking, isolating code and data, interchanging data between a host portion of the emulation library and the host OS portion, which is executed within the VM. The Lightweight Hypervisor 450 executes as a small VM which executes only specific code, namely the Portable Virtualization Kernel 440 and the Emulation Library 430 as well as code from the foreign application (e.g., all the threads of code) and, optionally, some native libraries of the foreign OS.

Figures 5, 6:
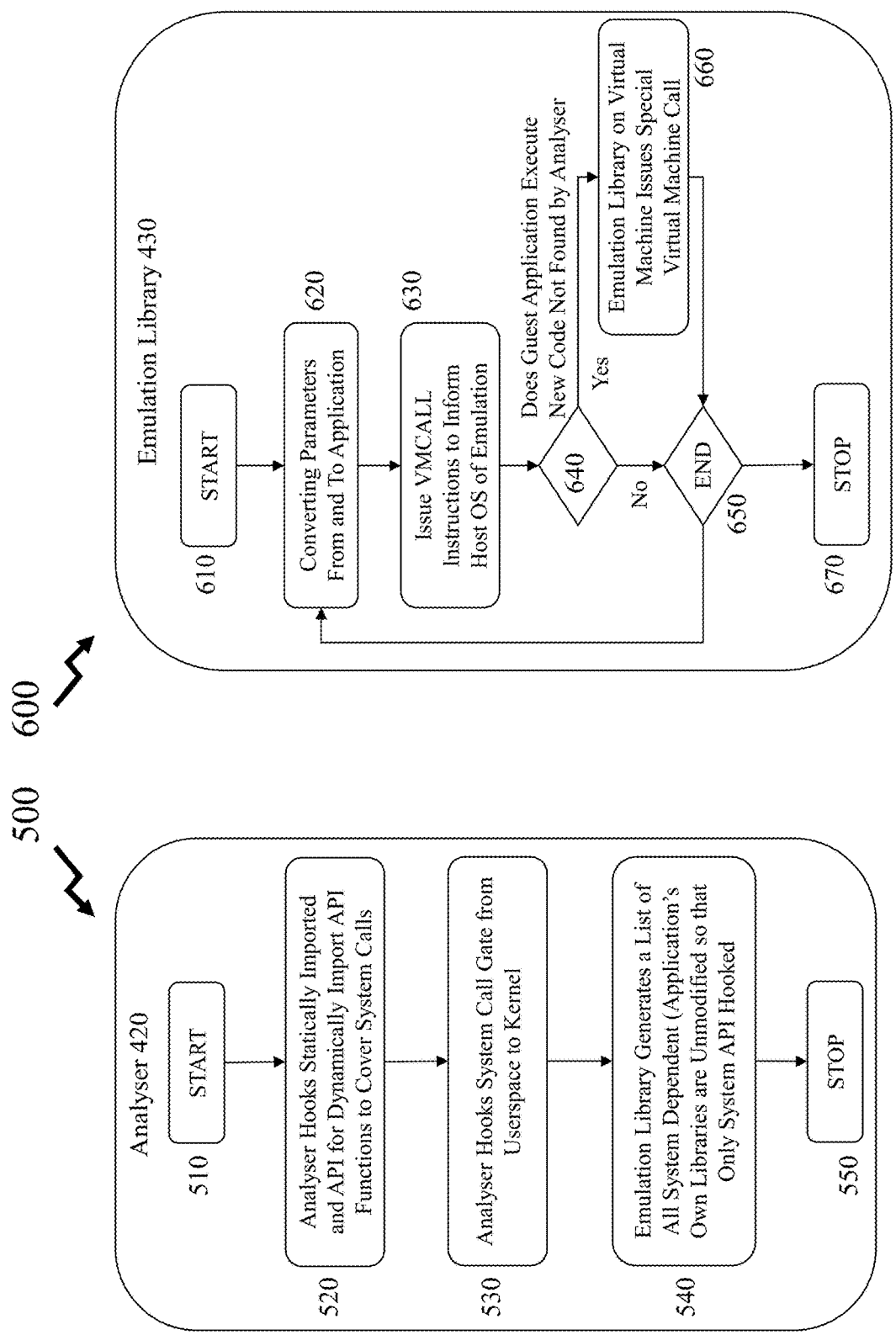
FIG. 5 depicts an exemplary process flow for an analyser element forming part of a structure of generating and executing a portable virtualization executable application according to an embodiment of the invention supported by a virtual machine.
FIG. 6 depicts an exemplary process flow for an emulation library element forming part of a structure of generating and executing a portable virtualization executable application according to an embodiment of the invention supported by a virtual machine.

Referring to FIG. 5 there is depicted a Process Flow 500 according to an embodiment of the invention depicting an exemplary flow for the first element of the Portable Virtualization Executable Application 410, this being the Analyser 420 as described and depicted in FIG. 4B.

As depicted the Process Flow 500 comprises first to fifth process steps 510 to 550 respectively wherein:

First process step 510 wherein the Analyser 420 starts execution before proceeding to second step 520;
Second process step 520 wherein the Analyser 420 establishes hooks for statically imported API functions and dynamic imported API functions to cover system calls before proceeding to third step 530;
Third process step 530 wherein the Analyser 420 then hooks all system call gates from the userspace to the kernel to see if the application will issue any calls without using the system API before proceeding to fourth step 540;
Fourth process step 540 wherein the Analyser 420 generates a list of all system dependent calls wherein the application's own libraries are left unmodified so that only the system API is hooked before proceeding to fifth step 550; and
Fifth process step 550 wherein the Analyser 420 stops execution.

Referring to FIG. 6 there is depicted a Process Flow 600 according to an embodiment of the invention depicting an exemplary flow for the second element of the Portable Virtualization Executable Application 410, this being the Emulation Library 430 as described and depicted in FIG. 4B. As depicted the Process Flow 600 comprises first to seventh steps 610 to 670 respectively wherein:

- First step 610 wherein the Emulation Library 430 starts execution;
- Second step 620 wherein the converts parameters from and to the application;
- Third step 630 wherein the Emulation Library 430 issues a VMCALL to inform the host OS of the application before proceeding to fourth step 640;
- Fourth step 640 wherein the Emulation Library 430 determines whether the application executes new code not found by the Analyser 430 or not wherein upon a positive determination it proceeds to sixth step 660 otherwise it proceeds to fifth step 650;
- Fifth step 650 wherein the Emulation Library 650 determines whether the emulation is to terminate or not wherein upon a positive determination the Process Flow 600 proceeds to seventh step 670 otherwise it loops back to second step 620 to proceed to convert further parameter to or from the application and issuing additional VMCALLs;
- Sixth step 660 wherein the Emulation Library 430 on the VM issues a special VM call before progressing to fifth step 650; and
- Seventh step 670 wherein the Emulation Library 430 stops execution.

Referring to FIG. 7 there is depicted a Process Flow 700 according to an embodiment of the invention depicting an exemplary flow for the third element of the Portable Virtualization Executable Application 410, this being the Portable Virtualization Kernel 440 as described and depicted in FIG. 4B. As depicted the Process Flow 700 comprises first to tenth sequence steps 710 to 795 respectively wherein:

- First step 710 wherein the Portable Virtualization Kernel 440 starts execution and proceeds to second step 720;
- Second sequence step 720 wherein Process Flow 700 initializes the memory layout with known values, i.e., those as dumped when Analyzer 430 executed through Process Flow 400 for example, and proceeds to third step 730;
- Third sequence step 730 wherein Process Flow 700 creates a virtual memory translation of all the memory pages of the application code of the application and proceeds to step 740;
- Fourth sequence step 740 wherein the Portable Virtualization Kernel 440 initializes a set of system registers including, for example, control registers such as CR0, CR3, and CR4 for example, debug registers such as DR0-7 for example, a fake Global Descriptor Table (GDT) and a fake Interrupt Descriptor Table (IDT) before proceeding to fifth step 750;
- Fifth sequence step 750 wherein the Process Flow 700 creates fake exception handlers in order to be able to hook all of them and proceeds to step 760;
- Sixth sequence step 760 wherein the Portable Virtualization Kernel 440 creates other system specific structures such as a t ask state segment (TSS) and proceeds to step 770;
- Seventh sequence step 770 allocates memory for stack and heap memory structures and proceeds to step 780;
- Eighth sequence step 780 wherein the Portable Virtualization Kernel 440 loads the native application code and proceeds to step 790;
- Ninth sequence step 790 wherein the Portable Virtualization Kernel 440 starts execution of the native application code and proceeds to step 70; and
- Tenth sequence step 795 wherein the Portable Virtualization Kernel 440 stops execution.

Within embodiments of the invention the majority of interactions with the host are performed through a common VMCALL instruction.

Referring to FIG. 8 there is depicted an exemplary Process Flow 800 for the portable virtualization generation of the Portable Application by the Portable Virtualization Executable Application 410 as depicted in FIG. 4B according to an embodiment of the invention. As depicted Process Flow 800 comprises first to ninth execution steps 810 to 890. Accordingly, the Process Flow 800 thereby links the previous parts together. Accordingly, first to ninth execution steps 810 to 890 comprise:

- First execution step 810 wherein the Portable Virtualization Generation Executable (PVGE) starts execution and proceeds to second step 820;
- Second execution step 820 wherein the PVGE acquires the output list from the Analyser 430 and proceeds to third step 830;
- Third execution step 830 wherein the PVGE acquires the memory layout dump with values from the Analyser 430 and proceeds to fourth step 840;
- Fourth execution step 840 wherein the PVGE acquires the application before proceeding to the fifth step 850;
- Fifth execution step 850 wherein the PVGE acquires both the required statically imported libraries and dynamically imported libraries before proceeding to sixth step 860;
- Sixth execution step 860 wherein the PVGE acquires any other files required before proceeding to seventh step 870;
- Seventh execution step 870 wherein the PVGE creates the native executable (Portable Application) which includes the required code from the emulation library and the kernel part of the VM which are bundled with the original application libraries together with the files and code for the hypervisor;
- Eighth execution step 880 wherein a link is established to instruct the application to launch from the native executable and its prepared libraries with the lightweight hypervisor; and
- Ninth execution step 890 wherein the PVGE stops execution.

Accordingly, within embodiments of the invention a native hypervisor engine may be employed to run the Portable Application, i.e., AppleHV for MacOS and KVM for Linux. Accordingly, the PVGE executes a build process that links altogether all the necessary elements to generate the Portable Application whilst establishing a link for instructing the application to start from the prepared Portable Application using the light hypervisor. The instructed application may, for example, be the application upon the Remote Access System 230, the application or a link (GUI icon etc.) to the application upon the Mobile Device 210, or the application or a link (GUI icon etc.) to the application upon the Client Device 220.

Figure 9:
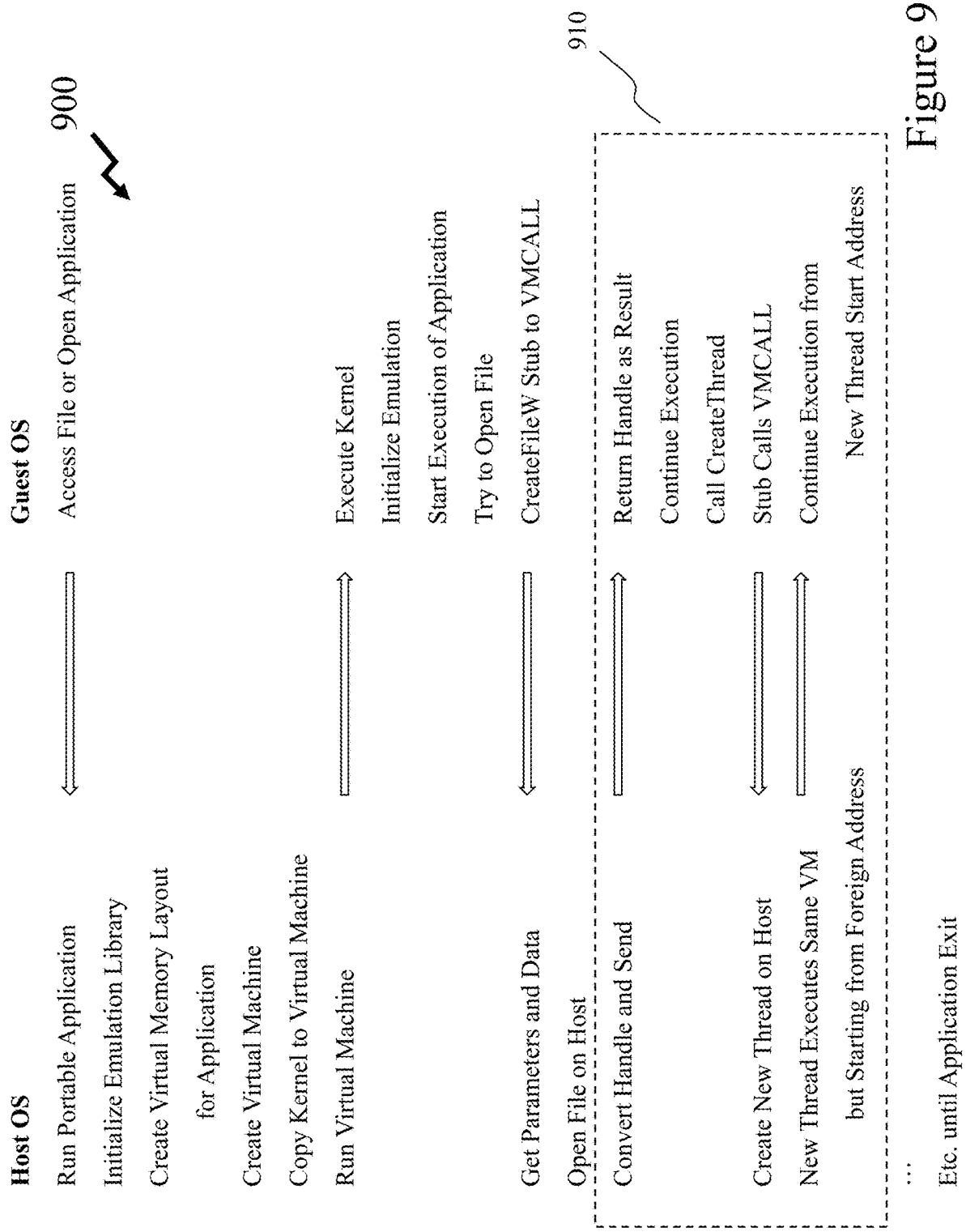
FIG. 9 depicts an exemplary process flow between a host system and a guest system for the generating and executing a portable virtualization executable application according to an embodiment of the invention supported by a virtual machine.

Referring to FIG. 9 there is depicted an exemplary Process Flow 900 between a host system and a guest system for the generating and executing a portable virtualization executable application according to an embodiment of the invention supported by a virtual machine. Within the Process Flow 900 the user initiates the process by seeking to access a file (e.g., double click) or an application, e.g., Windows™ Notepad, from a Guess OS upon a device, e.g., Mobile Device 210 or Client Device 220, wherein upon the Host OS, e.g., Remote Access System 230, the host system proceeds to execute the Portable Application.

Accordingly, a sequence comprising initialization of the emulation library, creation of the virtual memory layout for the Portable Application, creation of the VM and copying the kernel (e.g., Portable Virtualization Kernel 440) to the VM are performed before the VM is run. Accordingly, the Guest OS executes the kernel, initializes the emulation, starts execution of the application and tries to open the file the user requested.

Accordingly, the Guess OS establishes a CreateFileW stub for the VMCALL to the Host OS wherein the Host OS obtains the necessary parameters and data for the file, opens the file on the host system, converts a handle to send to the Guest OS. The Guest OS accordingly receives the returned handle from the Host OS as a result, continues execution and proceeds to call CreateThread wherein a stub calls VMCALL thereby creating a new thread on the Host OS where the new thread executes within the same VM as that previously established but starting from a foreign address wherein the Guest OS continues execution from the new thread start address. These steps within Block 910 repeating until there is an exit from the application.

If when the user initiates the process by seeking to open an application, e.g., Windows Microsoft™ Paint, from a Guess OS upon a device, e.g., Mobile Device 210 or Client Device 220, upon the Host OS, e.g., Remote Access System 230, where no Portable Application already exists then the host system proceeds to execute software to generate the Portable Application, e.g., Portable Virtualization Executable Application 410, before the remainder of Process 900 progresses.

If when the user initiates the process by seeking to open an application, e.g. Windows Microsoft™ Paint, from a Guess OS upon a device, e.g. Mobile Device 210 or Client Device 220, upon the Host OS, e.g. Remote Access System 230, where no Portable Application already exists then the host system may seek to extract the Portable Application from storage accessible to the Remote Access System 230 or from storage accessible to another Remote Access System with which the Remote Access System 230 is in communication with.

Optionally, a user may obtain the Portable Application from a repository wherein their access is a link to the Portable Application which is provided to the Remote Access System 230 when the user launches the application to which the Portable Application relates. The Remote Access System 230 may retrieve and execute the Portable Application, or it may, where the repository is another Remote Access System executing the Portable Application upon another Remote Access System. The user may obtain the Portable Application or the link to the Portable Application from the repository in dependence upon one or more aspects including, but not limited to, registration with the repository, provisioning of one or more credentials, payment of a fee.

Beneficially, embodiments of the invention provide the benefit that through the removal of the requirements to deploy the full OS of the application as well as the required environment to run the full OS and application the requirements for executing the application are reduced relative to the prior art provisioning of the application through a VM upon a full OS. This allows the Portable Application which provides the application through a light hypervisor in conjunction with emulation library, hooked calls, virtualization kernel etc. to either absorb reduced resources on a remote system, e.g., Remote Access System 230, or be transferred to another electronic system, e.g., Mobile Device 210 or Client Device 220, capable of supporting execution of the Portable Application. This is particularly beneficial to a user when the application is only sporadically or infrequently used.

Beneficially, embodiments of the invention required reduced resources when running the foreign OS application, i.e., reduced memory usage and reduced disk usage, as only the components of the foreign OS that are employed are bound to the application. Accordingly, the unused portions of the foreign OS are not bound with the application thereby do not consume disk space or memory.

Embodiments of the invention provide users with a virtualization methodology providing hardware assistance in isolating memory and code layout for applications, yet supporting sharing and interaction with normal performance.

Embodiments of the invention may be applied to most applications. However, some applications may require additional specific elements in order to exploit the embodiments of the invention. Such applications may include kernel code applications (which use special hardware or include kernel code components), system wide applications requiring access to the full foreign OS such as antivirus applications, firewall applications, large three-dimensional (3D) gaming applications and applications with global hooks on user activities.

It would be evident to one of skill in the art that some applications, when established as Portable Applications according to embodiments of the invention, may have some limitations, for example not being able to access all of the foreign OS files and directories, as these are not emulated or virtualized. In such instances, these limitations are similar to those existing with Wine programs and depends primarily on the integration possibility from foreign OS into host OS and vice-versa.

Within embodiments of the invention the process of creating the Portable Application may require operation of a user to establish which parts of the foreign OS should be fully emulated and what parts should be shared with the host OS. This choice depending upon either isolation or integration of the foreign application into the host OS. For example, this may require knowledge about what the application do and what is required for the end user, i.e., should share access be provided to a documents folder or should it be kept private.

However, it would be evident that handling such issues may be addressed through the use of policies associated with one or more of the application, the user, an enterprise associated with the user (e.g., employer), provider of the Remote Access System, provider of the virtualization software and/or software for example. Accordingly, for example, an administrator for an enterprise may establish the policies for all its users which are defined, for example, by software application, software application type (e.g., office productivity, graphics, word processing, etc.), or policies based upon aspects of the user, e.g., department, access rights, etc.

It would be evident that within other embodiments of the invention that one or more machine learning processes may be established, for example, upon the Remote Access System, which take as inputs all the requests for Portable Applications, the policies, etc. associated with them and establish guidelines or policies for either new enterprises, users, etc. exploiting Portable Applications or existing enterprises, users, etc. to optimize the generation and exploitation of Portable Applications.

For example, where Portable Applications are generated by different users for different functional subsets of an application then machine learning algorithms may analyse the different subsets to generate multiple Portable Applications for different common subsets. Alternatively, multiple Portable Applications may be generated for each specific functionality subset where these are "bundled" to the user within the VM in a manner transparent to the user.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps, and means described above may be done in various ways. For example, these techniques, blocks, steps, and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other mediums capable of storing, containing, or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g., software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
   receiving from a computer system a portable application for a software application to execute the software application upon another computer system; wherein
   the software application executes with a host operating system;
   the portable application executes the software application with a reduced version of the host operating system; and
   the portable application is executed with a lightweight hypervisor upon another computer system, wherein
   the portable application for the software application is generated by a virtualization executable application comprising:
     an analyser module;
     an emulation library; and
     a portable virtualization kernel;
     the lightweight hypervisor; wherein
   one of:
     the analyser module executes a process comprising the steps of:
       establishing hooks for statically imported application programming interface (API) functions and dynamic imported API functions to cover system calls;
       hook all system call gates from a userspace to a kernel to establish whether the software application when executed issues one or more calls without using a system API; and
       generate a list of all system dependent calls wherein libraries of the software application are not modified so that only the system API is hooked; and
     the analyser module is executed prior to the emulation library which comprises the steps of:
       converting parameters which are transferred from and to the software application;
       issuing a VMCALL to notify the host OS of the software application;
       determines whether the software application executes code not found by the analyser module; and
       upon a positive determination issuing a special virtual machine (VM) call.

2. A non-transitory storage medium storing computer executable instructions, the computer executable instructions when executed by a microprocessor cause the microprocessor to execute a process comprising:
   executing a virtualization executable application to generate a portable application for a software application and a link to execute the portable application; wherein
   the software application executes with a host operating system;
   the portable application executes the software application with a reduced version of the host operating system; and
   the portable application is executed with a lightweight hypervisor upon another computer system, wherein
   the portable application for the software application is generated by a virtualization executable application comprising:
     an analyser module;
     an emulation library; and
     a portable virtualization kernel;
     the lightweight hypervisor; wherein
   one of:
     the analyser module executes a process comprising the steps of:
       establishing hooks for statically imported application programming interface (API) functions and dynamic imported API functions to cover system calls;
       hook all system call gates from a userspace to a kernel to establish whether the software application when executed issues one or more calls without using a system API; and
       generate a list of all system dependent calls wherein libraries of the software application are not modified so that only the system API is hooked; and
     the analyser module is executed prior to the emulation library which comprises the steps of:
       converting parameters which are transferred from and to the software application;
       issuing a VMCALL to notify the host OS of the software application;
       determines whether the software application executes code not found by the analyser module; and
       upon a positive determination issuing a special virtual machine (VM) call.

3. A method comprising:
   receiving from a computer system a portable application for a software application to execute the software application upon another computer system; wherein
   the software application executes with a host operating system;
   the portable application executes the software application with a reduced version of the host operating system; and
   the portable application is executed with a lightweight hypervisor upon another computer system, wherein
   the virtualization executable application generating the portable application comprises:
     an analyser module;
     an emulation library; and
     a portable virtualization kernel;
     the lightweight hypervisor; wherein one of:
  the analyser module is executed prior to the portable virtualization kernel where the portable virtualization kernel executes a process comprising the steps of:
    initializing a memory layout with values established by the analyser module;
    create a virtual memory translation of all memory pages of the software application;
    initialize a set of system register
    create fake exception handlers to hook all exception handlers within the software application;
    create system specific structures;
    allocate memory for stack and heap memory structures;
    load the native application code of the software application; and
    initiates execution of the native application code; and
  the virtualization executable application executes a process comprising the steps of:
    executing the analyser module to generate a memory layout with values;
    acquire the software application;
    acquire the statically imported libraries required by the software application;
    acquire the dynamically imported libraries required by the software application;
    acquires other files required by the software application;
    creates the portable application by generating a native executable comprising:
      the output from the emulation library;
      the portable virtualization kernel;
      the statically imported libraries;
      the dynamically imported libraries; and
      the lightweight hypervisor.

4. A method comprising:
receiving from a computer system a portable application for a software application to execute the software application upon another computer system; wherein
the software application executes with a host operating system;
the portable application executes the software application with a reduced version of the host operating system;
the portable application is executed with a lightweight hypervisor upon another computer system, and
at least one of:
  the portable application for the software application exploits a link where the link instructs the software application to launch the portable application with the lightweight hypervisor rather than the software application;
  the portable application is one of a plurality of portable applications where each portable application of the plurality of portable applications implements a predetermined subset of the functionality of the software application and each predetermined subset of the functionality of the software application is less than the full functionality of the software application; and
  the portable application stores data relating to its execution which is stored upon the computer system where the portable application can be transferred from the other computer system to a further computer system during its execution and the portable application resumes execution upon the further computer system in dependence upon the data relating to its execution.

5. A non-transitory storage medium storing computer executable instructions, the computer executable instructions when executed by a microprocessor cause the microprocessor to execute a process comprising:
executing a virtualization executable application to generate a portable application for a software application and a link to execute the portable application; wherein
the software application executes with a host operating system;
the portable application executes the software application with a reduced version of the host operating system; and
the portable application is executed with a lightweight hypervisor upon another computer system,
the virtualization executable application generating the portable application comprises:
  an analyser module;
  an emulation library; and
  a portable virtualization kernel;
  the lightweight hypervisor; wherein
one of:
  the analyser module is executed prior to the portable virtualization kernel where the portable virtualization kernel executes a process comprising the steps of:
    initializing a memory layout with values established by the analyser module;
    create a virtual memory translation of all memory pages of the software application;
    initialize a set of system register
    create fake exception handlers to hook all exception handlers within the software application;
    create system specific structures;
    allocate memory for stack and heap memory structures;
    load the native application code of the software application; and
    initiates execution of the native application code; and
  the virtualization executable application executes a process comprising the steps of:
    executing the analyser module to generate a memory layout with values;
    acquire the software application;
    acquire the statically imported libraries required by the software application;
    acquire the dynamically imported libraries required by the software application;
    acquires other files required by the software application;
    creates the portable application by generating a native executable comprising:
      the output from the emulation library;
      the portable virtualization kernel;
      the statically imported libraries;
      the dynamically imported libraries; and
      the lightweight hypervisor.

6. A non-transitory storage medium storing computer executable instructions, the computer executable instructions when executed by a microprocessor cause the microprocessor to execute a process comprising:
executing a virtualization executable application to generate a portable application for a software application and a link to execute the portable application; wherein
the software application executes with a host operating system;
the portable application executes the software application with a reduced version of the host operating system;

the portable application is executed with a lightweight hypervisor upon another computer system; and at least one of:

the portable application for the software application exploits a link where the link instructs the software application to launch the portable application with the lightweight hypervisor rather than the software application;

the portable application is one of a plurality of portable applications where each portable application of the plurality of portable applications implements a predetermined subset of the functionality of the software application and each predetermined subset of the functionality of the software application is less than the full functionality of the software application; and the portable application stores data relating to its execution which is stored upon the computer system where the portable application can be transferred from the other computer system to a further computer system during its execution and the portable application resumes execution upon the further computer system in dependence upon the data relating to its execution.

* * * * *